United States Patent
Strahle et al.

(10) Patent No.: US 8,284,482 B2
(45) Date of Patent: *Oct. 9, 2012

(54) STEREOSCOPIC MICROSCOPE

(75) Inventors: Fritz Strahle, Heubach (DE); Christoph Hauger, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/071,975

(22) Filed: Mar. 25, 2011

(65) Prior Publication Data

US 2011/0170179 A1    Jul. 14, 2011

Related U.S. Application Data

(62) Division of application No. 12/090,827, filed as application No. PCT/EP2006/010156 on Oct. 20, 2006, now Pat. No. 7,933,065.

(30) Foreign Application Priority Data

Oct. 20, 2005 (DE) .......................... 10 2005 050 345
Mar. 1, 2006 (DE) .......................... 10 2006 009 452

(51) Int. Cl.
    *G02B 21/22* (2006.01)
(52) U.S. Cl. ........................................ 359/368; 359/376
(58) Field of Classification Search .......... 359/372–377, 359/385, 389
    See application file for complete search history.

(56) References Cited

U.S. PATENT DOCUMENTS

| | | | |
|---|---|---|---|
| 3,186,300 A | 6/1965 | Littmann | |
| 4,605,287 A * | 8/1986 | Lang et al. | 359/374 |
| 4,702,570 A | 10/1987 | Yoshino et al. | |
| 4,991,947 A | 2/1991 | Sander et al. | |
| 5,126,877 A | 6/1992 | Biber | |
| 5,341,239 A | 8/1994 | Hanzawa | |
| 5,403,307 A * | 4/1995 | Zelman | 606/6 |
| 5,420,716 A * | 5/1995 | Fukaya | 359/368 |
| 5,612,816 A | 3/1997 | Strahle et al. | |

(Continued)

FOREIGN PATENT DOCUMENTS

DE    90 16 892.5 U1    4/1991

(Continued)

OTHER PUBLICATIONS

Office Action in the counterpart European Application No. 06 806 440.1-1234, dated Sep. 22, 2011, 11 pages.

(Continued)

*Primary Examiner* — Mark Consilvio
(74) *Attorney, Agent, or Firm* — Potomac Patent Group PLLC

(57) ABSTRACT

A microscope or stereomicroscope for representing an object that can be placed on an object plane of the stereomicroscope provides at least one pair of optical paths and comprises at least one deflection element with a reflecting surface and a representation system containing several optical elements. The optical elements include a plurality of lenses. In addition, the optical elements are configured in such a way that pupil planes of the optical representation paths intersect the reflecting surface of the deflection element or are located at a distance from said reflecting surface less than 1.5 times the diameter of one of the reflecting surfaces along the optical representation paths on the closest lens of the plurality of lenses. An alternative embodiment provides a stereomicroscope with a particularly compact construction, in which at least one pair of optical representation paths is reflected on a first, second, third, and fourth reflecting surface.

19 Claims, 16 Drawing Sheets

U.S. PATENT DOCUMENTS

| | | | |
|---|---|---|---|
| 5,612,817 | A | 3/1997 | Strahle |
| 5,701,196 | A | 12/1997 | Nakamura |
| 5,822,114 | A * | 10/1998 | Hanzawa ............... 359/380 |
| 5,856,883 | A | 1/1999 | Sander |
| 5,867,311 | A | 2/1999 | Nakamura |
| 5,912,763 | A * | 6/1999 | Spink ..................... 359/363 |
| 6,338,711 | B1 * | 1/2002 | Sekiya et al. ........... 600/166 |
| 6,473,229 | B2 * | 10/2002 | Nakamura ............. 359/377 |
| 6,525,878 | B1 | 2/2003 | Takahashi |
| 6,560,013 | B1 | 5/2003 | Ramsbottom |
| 7,199,923 | B2 * | 4/2007 | Sander .................... 359/376 |
| 7,933,065 | B2 * | 4/2011 | Strahle et al. ........... 359/376 |
| 2001/0010592 | A1 | 8/2001 | Nakamura |
| 2002/0075449 | A1 | 6/2002 | Strahle |
| 2002/0085273 | A1 | 7/2002 | Ito |
| 2003/0165012 | A1 | 9/2003 | Straehle et al. |
| 2004/0091259 | A1 | 5/2004 | Hanzawa |
| 2004/0120032 | A1 | 6/2004 | Sander |
| 2004/0136059 | A1 | 7/2004 | Sander |
| 2004/0164214 | A1 | 8/2004 | Gartner et al. |
| 2004/0184141 | A1 | 9/2004 | Sander |
| 2005/0111088 | A1 | 5/2005 | Winterot et al. |
| 2005/0174655 | A1 | 8/2005 | Straehle et al. |
| 2005/0248837 | A1 | 11/2005 | Sase et al. |
| 2006/0012854 | A1 | 1/2006 | Sander |
| 2006/0023300 | A1 | 2/2006 | Sander |
| 2006/0141662 | A1 | 6/2006 | Brabec et al. |
| 2007/0127115 | A1 | 6/2007 | Hauger et al. |
| 2008/0117501 | A1 | 5/2008 | Sander |
| 2008/0212171 | A1 * | 9/2008 | Strahle et al. ........... 359/377 |
| 2009/0059363 | A1 * | 3/2009 | Straehle et al. ......... 359/389 |
| 2011/0122490 | A1 * | 5/2011 | Doi et al. ................ 359/385 |

FOREIGN PATENT DOCUMENTS

| | | |
|---|---|---|
| DE | 43 36 715 A | 4/1994 |
| DE | 195 46 746 A1 | 6/1996 |
| DE | 197 18 102 A1 | 12/1997 |
| DE | 101 33 671 A1 | 1/2002 |
| DE | 103 00 925 A1 | 9/2003 |
| DE | 103 30 581 A1 | 3/2004 |
| DE | 102 55 961 B3 | 4/2004 |
| DE | 102 55 960 A1 | 6/2004 |
| DE | 102 55 965 A1 | 6/2004 |
| DE | 102 55 967 A1 | 6/2004 |
| DE | 102 55 964 A1 | 7/2004 |
| DE | 103 12 681 A1 | 10/2004 |
| DE | 103 12 471 A1 | 12/2004 |
| DE | 103 23 091 A1 | 12/2004 |
| DE | 103 32 603 A1 | 2/2005 |
| DE | 103 55 527 A1 | 6/2005 |
| DE | 10 2004 052 253 A1 | 7/2005 |
| DE | 10 2005 013 570 A1 | 11/2005 |
| DE | 10 2005 021 569 A1 | 12/2005 |
| EP | 0 511 443 A1 | 11/1992 |
| EP | 0 582 148 B1 | 2/1994 |
| EP | 0 363 762 B1 | 1/1996 |
| EP | 1 293 819 A1 | 3/2003 |
| EP | 1 580 586 A1 | 9/2005 |
| JP | 10260359 A | 29/1998 |
| JP | 2001117009 A | 27/2001 |
| JP | 2002090650 A | 27/2002 |
| JP | 07140395 | 2/1995 |
| JP | H07-140359 A | 6/1995 |
| JP | 11109254 A * | 4/1999 |
| JP | 2000028927 A * | 1/2000 |
| JP | 2001091848 A * | 4/2001 |
| JP | 2001-117049 A | 8/2001 |
| JP | 2001-208979 A | 8/2001 |
| JP | H11-501734 A | 2/2002 |
| JP | 2002-174773 A | 6/2002 |
| JP | 2003-510119 A | 3/2003 |
| JP | 2003270544 A * | 9/2003 |
| JP | 2004029575 A * | 1/2004 |

OTHER PUBLICATIONS

Office Action in the counterpart Japanese Application No. 2008-535978 dated Dec. 1, 2011, 5 pages.

Non-Final Office Action for U.S. Appl. No. 12/090,827 mailed on Sep. 1, 2010, 11 pages.

Notice of Allowance for U.S. Appl. No. 12/090,827 mailed on Dec. 23, 2010, 8 pages.

Office Action in related German Patent Application No. 10 2006 062 888.8 dated May 16, 2012, 11 pages.

* cited by examiner

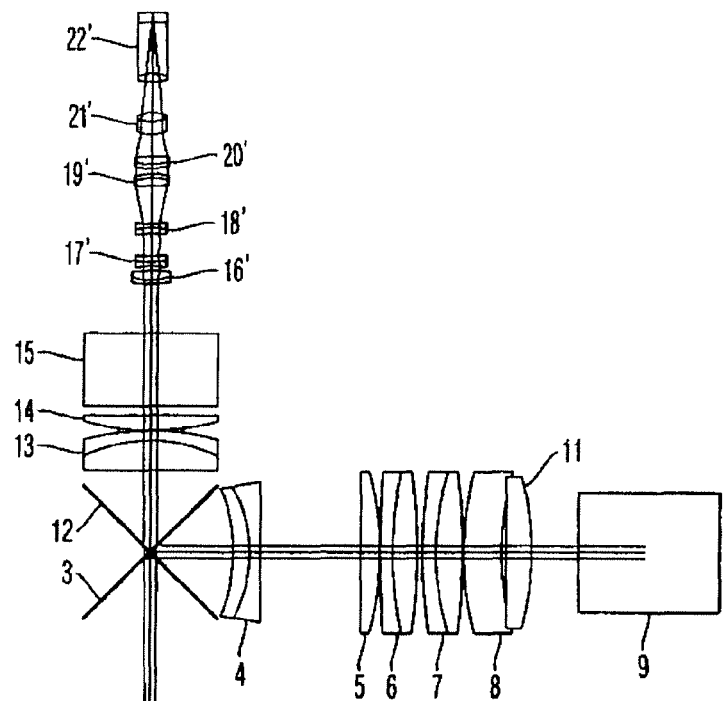
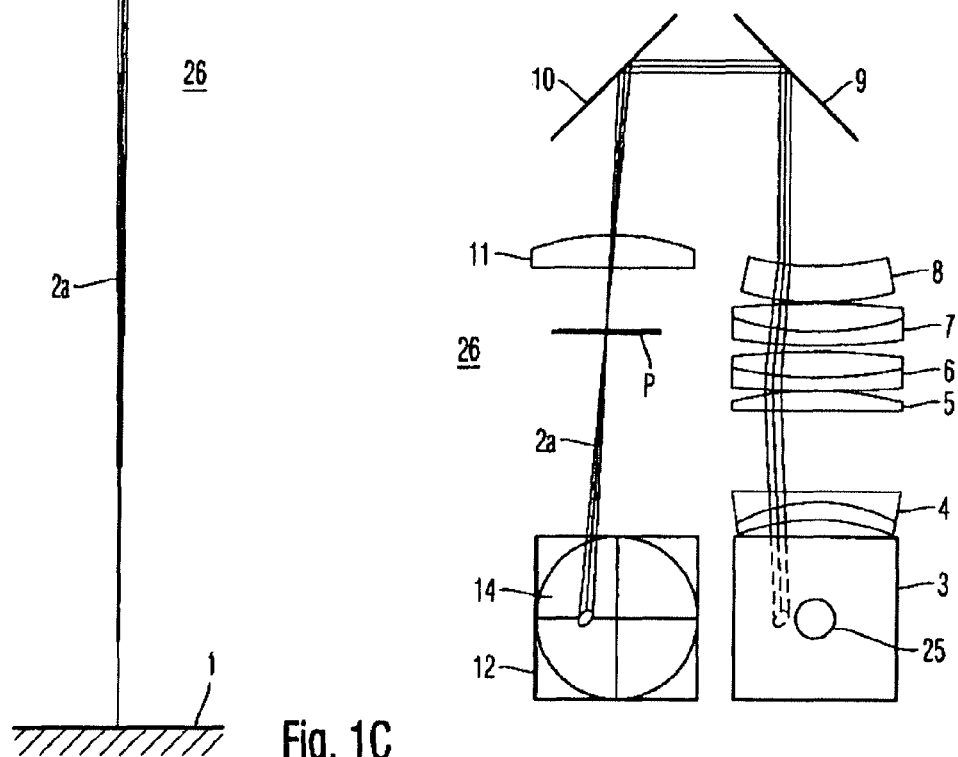
Fig. 1C
Fig. 1B

STEREOSCOPIC MICROSCOPE

CROSS-REFERENCES TO RELATED APPLICATIONS

This application is division of U.S. patent application Ser. No. 12/090,827, filed Apr. 18, 2008, which is a national stage application of International Application No. PCT/EP2006/010156, filed Oct. 20, 2006 (this international patent application was not published in the English language), which claims the benefit of German Patent Application No. 10 2005 050 345.4, filed Oct. 20, 2005 and German Patent Application No. 10 2006 009 452.2, filed Mar. 1, 2006. The entire contents of each of the above-identified applications is hereby incorporated by reference.

BACKGROUND OF THE INVENTION

The present invention relates to an improved microscope. Further, the present invention relates to a stereoscopic microscope for imaging an object that can be placed in an object plane of the stereoscopic microscope, wherein the stereoscopic microscope provides at least one pair of imaging beam paths. The stereoscopic microscope comprises an imaging system with several optical elements, wherein the several optical elements comprise a plurality of lenses and at least one deflecting element having a mirror surface for deflecting the at least one pair of imaging beam paths.

Such microscopes, and especially stereoscopic microscopes, are used as surgical microscopes in medical applications, for example. The basic structure of a stereoscopic microscope such as known from the German laid open print DE 19 718 102 A1 is schematically shown in FIG. 8A.

According to FIG. 8A a stereoscopic microscope for imaging an object that can be placed in an object plane 41 comprises an objective lens 44, an aperture 45 and a variable magnification system with an inversion system 51. Further, on an exit side of the magnification system with inversion system 51, left sided and right sided optical imaging systems are provided. One pair of imaging beam paths 42a and 42b are commonly guided in the objective lens 44 and in the magnification system with inversion system 51. The optical beam paths 42a and 42b are guided separately in lenses 56 and 57 and 56' and 57' respectively of the left sided and right sided imaging systems. For achieving a stereoscopic effect, the imaging beam paths include a stereoscopic angle .alpha. in the object plane 41, the angle usually being between 4° and 8°.

The aperture 45 is used for altering the sensitivity of the stereoscopic microscope. For this purpose, a pupil plane 4A of an entrance pupil of the imaging beam paths 42a and 42b must be located in the vicinity of the aperture 45 and thus in between the objective lens 44 and the variable magnification system with inversion system 51.

In this respect, a pupil plane is considered to be a curved or flat plane in which central or main beams of beam bundles guided in the imaging beam path 42a and 42b intersect one another, wherein the central or main beams are emitted from different object points in the object plane 41.

The imaging system of the stereoscopic microscope shown in FIG. 8A further causes imaging of an intermediate image 4P within the variable magnification system with inversion system 51. Due to the minimal diameter of the beam bundle guided by the imaging system in the intermediate image this facilitates a threading of the beam bundles through the variable magnification system with inversion system 51.

In this respect, an intermediate image is considered to be a plane that is optically conjugated to the object plane 41.

A perspective view of selected elements of a stereoscopic microscope known from the prior art according to DE 19 718 102 A1 having the principal structure known from FIG. 8A is schematically illustrated in FIG. 8B.

As is evident from FIG. 8B, the stereoscopic microscopes known from the prior art comprise a plurality of deflecting elements 43, 46, 47, 49, 51, 52, 53 and 54, each comprising at least one mirror surface, to fold an imaging beam path 42 formed by the pair of imaging beam paths. The reason for this folding is that a total length of the structure of the stereoscopic microscope is to be made smaller. Due to this folding it is further possible to integrate an illumination beam path of an illumination system (not shown) via a deflecting mirror 43 located before the objective lens 44 neighboring the object plane 41 into the imaging beam path 42. Thus a 0° illumination of an object that can be placed in the object plane 43 is possible. To achieve this the mirror 43 has a surface which is semi-transparent. Furthermore, the folding causes an exchange of the pupils and an image inversion and thus corrects an exchange of the pupils and image inversion caused by the lenses 44, 50, 55 and the magnification system 48 of the stereoscopic microscope.

The structure of a stereoscopic microscope of the prior art described above has the following disadvantages:

Integration of 0° illumination system by using a semi-transparent mirror 43 causes substantial losses in both the illumination beam path and the imaging beam path. The reason is that the semi-transparent mirror does not completely deflect the imaging beams, and does not completely let pass the illumination beams guided in the illumination beam path. Consequently, the intensity of the beams emitted by the illumination system must be increased, which may cause heat problems in a surgical field and thus increase stress to the patient.

Furthermore, with an integration of a 0° illumination by using a semi-transparent mirror, the occurrence of reflections during transition of the illumination beams through the semi-transparent mirror that can be recognized in the imaging beam guided by the imaging beam path can only be avoided with large effort. The reason is that the imaging beam paths and the illumination beam path inherently overlap in the system of the stereoscopic microscope known from the prior art.

It is a further disadvantage of the structure known from the prior art that the structure uses eight deflecting elements for folding the imaging beam path and thus has a structure with a high volume. This structure with the high volume results from the fact that the user requires a stereoscopic microscope having one or two tube optics with oculars that can be freely pivoted, wherein one pair of imaging beam paths is guided to each tube optics with oculars. The reason is that the pairs of optical beam paths must be completely folded by a respective deflecting element even after pivoting of the respective tube.

A microscope-endoscope-examination system for examination of an object is known from DE 10 2004 059 143, the contents of which is completely incorporated by reference. The known system comprises an endoscope optics having a main optics with an endoscope beam path and a stereoscopic microscope beam path. A first and second optical element of the main optics is arranged next to an object plane of the stereoscopic microscope beam path and traversed, respectively, by a left and a right beam path of the stereoscopic microscope beam path. Central beam path axes of central beams of the respective left and right beam paths are arranged essentially in one common plane in between the object plane and the first respective second optical element, wherein all optical elements of the endoscope optics are at least partially arranged in between the two central beam axes when viewed in a projection to the common plane. However, the mounting of the known system is very cumbersome.

Starting from the above prior art it is an object of the present invention to provide a stereoscopic microscope having an improved structure in comparison to the prior art.

SUMMARY OF THE INVENTION

Embodiments of the present invention provide a stereoscopic microscope which provides degrees of freedom for at least one observer with respect to their position relative to an object to be observed that can be placed in an object plane.

Furthermore, embodiments of the present invention provide a stereoscopic microscope which comprises a secondary beam path that includes an angle smaller than 5° and especially smaller than 3° and further especially substantially equal to 0° with imaging beam paths of the stereoscopic microscope, wherein a deterioration of imaging beams guided in the imaging beam paths due to secondary beams guided in the secondary beam path is avoided with high efficiency.

Further embodiments provide a stereoscopic microscope having an especially compact structure.

Further embodiments provide an improved microscope that is well suited to be used in combination with an endoscope.

According to an embodiment of the present invention a stereoscopic microscope for imaging an object that can be placed in an object plane of the stereoscopic microscope is disclosed, wherein the stereoscopic microscope provides at least one pair of imaging beam paths. The stereoscopic microscope comprises at least one deflecting element with (at least) one mirror surface, as well as an imaging system with several optical elements, wherein the several optical elements comprise a plurality of lenses. In this respect, the several optical elements are configured such that pupil planes of the imaging beam paths intersect the mirror surface of the at least one deflecting element or are arranged with a distance from the mirror surface. In this respect, the distance is smaller than 1.5 times and especially smaller than 1.0 times and further especially smaller than 0.5 times a diameter of a lens of the plurality of lenses, which lens is arranged closest to the imaging surface along the imaging beam paths.

In summary, the imaging beam paths are guided such that a pupil plane (plane, in which imaging of a pupil occurs) is arranged in the vicinity of a mirror surface of the at least one deflecting element of the stereoscopic microscope. Due to the stereoscopic angle that is pairwise included by the imaging beam paths in the object plane, this causes that the imaging beam paths do not overlap in the vicinity of the mirror surface. This clear separation of the imaging beam paths allows for the provision of a secondary beam path in between the imaging beam paths (0-degree arrangement) that substantially does not cause any deterioration of beams guided in the imaging paths.

In this respect, the term "pupil plane" denominates the plane that is defined by imaging of a pupil in a respective imaging beam path. The term "plane" in the context of "pupil plane" is not limited to a mathematical plane in this document but denominates a surface that is usually curved. According to an embodiment the pupil plane is the plane in which an entry pupil of an objective of the stereoscopic microscope is located.

Furthermore, according to an embodiment, the distance between a pupil plane of a respective imaging beam path and the mirror surface is measured starting from a surface that is maximally covered by a beam cross-sectional area of a respective imaging beam path parallel to the beam path of a respective imaging beam path. According to a further embodiment, the distance is measured starting from a center of area of the surface maximally covered by the beam cross-sectional area on the mirror surface and parallel to a central beam of the imaging beam path.

According to a further exemplary embodiment the several optical elements of the stereoscopic microscope are configured such that surfaces defined by imaging of pupils of the imaging beam path intersect the mirror surface of the at least one deflecting element or are arranged with a distance from the mirror surface. In this respect, the distance is smaller than 1.5 times and especially smaller than 1.0 times and further especially smaller than 0.5 times a diameter of a lens of the plurality of lenses arranged closest to the mirror surface along the imaging beam paths starting from a center of area of a surface maximally covered on the mirror surface by a cross-sectional area of a respective imaging beam path. Further, the mirror surface of the deflecting element is located next to the images of the pupil of the imaging beam paths according to this embodiment.

Configuration of the optical elements of the stereoscopic microscope for arranging the images of the pupils of the imaging beam paths in the vicinity of the mirror surface of a deflecting element can be achieved, for example by using a commercial computer program for calculating optical systems such as Code V. Like programs allow input of a position of the images of the pupils of the imaging paths and output the optical parameters of the used optical elements that are necessary in this respect.

According to a further exemplary embodiment, no optically effective elements are provided in between the mirror surface of the deflecting element and the object plane of the stereoscopic microscope. Thus, the imaging beam paths in between the mirror surface of the deflecting element and the object plane of the stereoscopic microscope are free from optically effective elements. In this respect, optically effective elements are considered to be elements addition of which or removal of which causes a variation of a working distance of the stereoscopic microscope of more than 1% and further especially of more than 2% and further especially of more than 5%.

According to a further exemplary embodiment, the several optical elements of the imaging system further comprise the at least one deflecting element, wherein the mirror surface of the at least one deflecting element is capable of deflecting the at least one pair of imaging beam paths.

Thus, according to this embodiment imaging of a pupil plane of the imaging beam paths on the side of the object is performed in the vicinity of a mirror surface deflecting the imaging beam paths. Due to a stereoscopic angle that is pairwise included in the object plane by the imaging beam paths, this results in that the imaging beam paths meeting the mirror surface do not overlap in the vicinity of the mirror surface.

According to a further exemplary embodiment, beam bundles of the imaging beam paths each define beam cross-sectional areas on the mirror surface of the at least one deflecting element that have a distance from one another. This distance in between the cross-sectional areas allows for the provision of a zero-degree-arrangement of a secondary beam path (for example an illumination system, a treatment system or an endoscope), for example. However, the present invention is not restricted to such a zero-degree-arrangement of the secondary beam path.

According to a further exemplary embodiment the stereoscopic microscope provides at least one secondary beam path, that traverses the deflecting element in an area in between the beam cross-sectional areas of the imaging beam paths.

Due to the distances in between the beam cross-sectional areas, no overlap of the imaging beam paths with the at least one secondary beam path occurs in the mirror surface. Thus, it is guaranteed that beams guided in the secondary beam path are not imaged by the imaging beam paths, for example as a consequence of reflections of the mirror surface. Furthermore, location of the secondary beam path in the distance in between the two imaging beam paths allows for the provision of a secondary beam path, for example for 0° illumination of an object that can be placed in the optic plane, in an especially easy and accurate manner. Alternatively, this secondary beam path can be used for arbitrary diagnostic or therapeutic uses such as, for example, in the context of Optical Coherence Tomography (OCT). In this respect it is emphasized that the separation of the beam cross-sectional areas is achieved by location of the pupil plane defined by pupils of the imaging beam paths in the vicinity of the mirror surfaces, as otherwise the beam bundles of the imaging beam paths would have diffuse and overlapping beam cross-sectional areas on the mirror surface.

According to a further exemplary embodiment the stereoscopic microscope comprises at least one pipe, that traverses the at least one deflecting element in a region in between the beam cross-sectional areas of the imaging beam paths. Consequently, the pipe in the area in between the beam cross-sectional areas can be used for transpassing a diagnostic apparatus or a manipulator or such, for example. This can be especially advantageous in neurosurgery.

According to a further embodiment the secondary beam path is guided in the pipe. Thus, the pipe may be part of an endoscope system, for example.

It can be further advantageous if the at least one deflecting element comprises a cut, traversed by the at least one secondary beam path in the area in between the beam cross-sectional areas of the imaging beam paths. In this respect, the at least one deflecting element exemplary may contain two separate mirror surfaces or one mirror surface traversed by the cut.

Provision of a cut in the at least one deflecting element is possible, as an area located in between beam cross-sectional areas of beam bundles guided by the imaging beam paths can be identified, due to the location of the pupil planes in the vicinity of the mirror surface, which area is not necessary for deflecting the imaging beam paths.

Alternatively it may be advantageous that the imaging beam paths are configured for imaging beams of a first range of wavelengths, and that the at least one deflecting element has a reflectivity for beams of the first range of wavelengths in the area in between the beam cross-sectional areas of the imaging beam paths that is smaller than a reflectivity of the at least one deflecting element for beams of the first range of wavelengths in an area of the beam cross-sectional areas.

Consequently, the mirror surface of the at least one deflecting element may have full, or at least partial, transparency in the area in between the cross-sectional areas of the imaging beam paths, for traversing the at least one secondary beam path. As the transparency is limited to the region in between the cross-sectional areas of the imaging beam paths, a best possible reflection, and thus deflection of the imaging beam paths, occurs in the area of the beam cross-sectional areas. Consequently, the regional transparency of the at least one deflecting element does not adversely effect the intensity of beams guided in the imaging beam paths deflected by the mirror surface of the at least one deflecting element.

According to an alternative embodiment the imaging beam paths can be configured for imaging beams of a first range of wavelengths, and the at least one secondary beam path can be configured for imaging beams of a second range of wavelengths different from the first range of wavelengths. In this respect it can be advantageous if the at least one deflecting element has a reflectivity for beams of the first range of wavelengths in the area of the beam cross-sectional areas of the imaging beam paths which is higher than a reflectivity for the beams of the second range of wavelengths.

Consequently, the at least one deflecting element can have a dichroitic surface for guiding as well the imaging beam paths as well as the at least one secondary beam path.

According to a further exemplary embodiment the stereoscopic microscope further provides at least one secondary beam path and the mirror surface of the at least one deflecting element is configured for deflecting the at least one secondary beam path.

Consequently, imaging of pupil planes at the object side of the imaging beam paths occurs in the vicinity of a mirror surface in this further exemplary embodiment, which mirror surface does not deflect the imaging beam paths as in the first embodiment, but deflects the secondary beam path. As no overlap of the imaging beam paths with the at least one secondary beam path occurs on the mirror surface, in this further embodiment, reference is made to the advantages described with respect to the first embodiment.

In this respect, beam bundles of the imaging beam paths may each define beam cross-sectional areas in the pupil planes, that have a distance from one another. The mirror surface of at least one deflecting element can be located in an area in between the cross-sectional areas of the imaging beam paths without beams guided by the imaging beam paths being deflected by the mirror surface.

In this respect it can be advantageous that a diameter of a projection of the mirror surface of the at least one deflecting element along the imaging beam paths is smaller, or equal to, the distance of the beam cross-sectional areas.

To avoid a deterioration of beams guided by the imaging beam paths it can be advantageous if the beam cross-sectional areas of the imaging beam paths in the pupil plane are free from the mirror surface of the at least one deflecting element.

According to an alternative embodiment the imaging beam paths are configured for beams of a first range of wavelengths, and the (at least one) secondary beam path is configured for imaging beams of a second range of wavelengths different from the first range of wavelengths. Furthermore, beam bundles of the imaging beam paths define beam cross-sectional areas in the pupil planes, which have a distance from one another. Then the at least one deflecting element may have a reflectivity for beams of the second range of wavelength in at least a region outside of the beam cross-sectional areas of the imaging beam paths that is larger than a reflectivity for the beams of the first range of wavelengths.

Consequently, the deflecting element may be a dichroitic mirror surface, that is configured for selective deflection of only beams guided by the secondary beam path and, simultaneously, preferably straight transmission of beams guided by the imaging beam paths.

It can generally be advantageous if the stereoscopic microscope further comprises an illumination system for illuminating the optic plane, wherein the illumination system comprises a beam source and an illumination optics, which illumination optics provides at least one secondary beam path.

Consequently, a 0° illumination for illuminating an object that can be placed in the object plane can be provided by the secondary beam path in an easy and reliable manner, without deterioration of the imaging beams guided in the imaging beam paths.

It can be of further advantage if the stereoscopic microscope additionally or alternatively comprises an infrared imaging system with an infrared imaging optics, that provides the at least one secondary beam path.

Thus, the secondary beam path further allows a 0° observation of an object that can be placed in the optic plane by using an infrared observing system. With infrared observing systems it is essential that the beam path of the infrared observing system transverses as few optical lenses as possible, as the temperature of the traversed optical lenses otherwise influences beams received by the infrared observing system.

It can be of further advantage if the stereoscopic microscope additionally or alternatively comprises a laser with a beam guiding system, that provides the at least one secondary beam path.

Such a laser can be used in cancer treatment for therapeutic purposes, for example.

According to an embodiment the imaging system comprises a first subsystem, the optical elements of which comprise a plurality of lenses, that are commonly traversed by both imaging beam paths of the at least one pair of beam paths.

Consequently, the generally common principal structure of a stereoscopic microscope can be maintained with the proposed stereoscopic microscope.

In this case it can be advantageous if the lens located closest to the at least one mirror surface along the imaging beam paths is a lens of the first subsystem.

Suitable choice of the optical system data of the lens that is located closest allows an automatic adaptation of the stereoscopic angle included by the at least one pair of imaging beam paths in the object plane, even in cases of a variation of the working distance of the stereoscopic microscope. In this respect it is emphasized that the stereoscopic angle does not need to be constant. It is only necessary that the imaging beam paths intersect in the object plane even after a variation of the working distance including a certain angle different from zero.

It can be of further advantage if the plurality of lenses of the first subsystem are arranged along one common optical axis, and if at least two lenses of the first subsystem are displaceable relative to one another along the optical axis.

In this case, the at least two lenses of the first subsystem can be displaceable along the optical axis relative to one another, to vary the distance of the optical plane from the stereoscopic microscope and/or a magnification of the caused image.

It then can be guaranteed by the choice of the system data of the optical lenses known for the skilled person that the at least one pair of imaging beam paths automatically includes a stereoscopic angle in the object plane, even after a variation of the distance of the object plane from the stereoscopic microscope, and thus the working distance and/or a variation of the magnification of the image.

Further, the optical element of the first subsystem can be configured such that the object plane of the stereoscopic microscope is imaged into an intermediate image, which is located between one pair of lenses of the first subsystem.

The provision of an intermediate image in the region of the first subsystem allows a compact structure and a facilitated correction of image defects.

According to a further embodiment, the imaging system can comprise a second subsystem, the optical elements of which comprise a plurality of lenses, which respectively are traversed by only one imaging beam path of the at least one pair of imaging beam paths.

In this case it can be advantageous if the stereoscopic microscope further comprises a beam splitter arrangement with at least one partially transparent mirror surface, which is traversed by a first pair of imaging beam paths of the at least one pair of imaging beam paths, and which reflects a second pair of imaging beam paths of the at least one pair of imaging beam paths.

Consequently, due to the use of a physical beam splitter, it is possible to provide two separate pairs of imaging beam paths that can be magnified independently of one another in the second subsystem. This is useful if an object that can be placed in the object plane is to be observed by two observers at the same time, or even if together with the observation by an observer, some form of logging using a camera is also required, for example.

By this means, the independent pairs of imaging beam paths provide degrees of freedom with respect to their arrangement relative to the object to be observed that can be placed in the object plane.

It can be of further advantage if at least two lenses of the second subsystem are displaceable relative to another along the optical axis, to vary a magnification of the image.

The second subsystem may further comprise at least one tube optics with oculars.

Thus, direct observation of the image of an object that can be placed in the object plane caused by the stereoscopic microscope by a user is possible. Alternatively, or additionally, the second subsystem may comprise at least one pair of cameras.

This allows a stereoscopic logging of the image of an observed object that can be placed in the object plane provided by the stereoscopic microscope, for example.

According to a further embodiment the stereoscopic microscope can further provide a selector arrangement to select one pair of partial beam bundles of a beam bundle guided by the imaging system at the image side, wherein the selector arrangement is capable of displacing a beam cross-section of at least one of the two partial beam bundles relative to a beam cross-section of the beam bundle of the image side.

Consequently, definition of the imaging beam bundles is only performed in the selector arrangement, that defines partial beam bundles in a beam path guided in the imaging system, the beam cross-sections of which are displaced relative to a beam cross-section of the total image sided beam bundles.

Due to the displacement caused by the selector arrangement, the two temporally successive partial beam bundles include a stereoscopic angle in the object plane in the case of corresponding adaptation of the selector arrangement to the imaging system. Consequently, images of partial beam bundles that have been displaced relative to one another by the selector arrangement, and which images have been obtained succeeding each other in time, together contain the full stereoscopic information. This allows a stereoscopic logging of an image of an object that can be placed in an object plane caused by the stereoscopic microscope, even in cases when one single camera is used rather than two cameras or one stereoscopic camera. It is even possible to realize a digital stereoscopic microscope using only one digital camera.

In this case it can be advantageous if the selector arrangement is located next to the at least one mirror surface of the at least one deflecting element, and if the selector arrangement comprises at least one switchable aperture located in a beam cross-section of the beam bundles at the image side, which switchable aperture selectively transmits the first partial beam bundle or the second partial beam bundle.

As the beam cross-sectional areas of the imaging beam paths can be determined with ease in the vicinity of the mirror surface of the at least one deflection element, due to the location of the pupil plane in the vicinity of the mirror surface, integration of the selector arrangement is possible without great effort.

Alternatively, the selector arrangement can be integrated into the at least one switching element. In this case, the mirror surface of the at least one switching element is switchable.

Consequently, arrangement of the pupil plane of the imaging beam paths can be performed in the mirror surface of the at least one deflection element without the necessity of considering the selector arrangement.

In this respect, the switchable mirror surface can comprise a plurality of separately switchable mirror elements, that can be switched from a beam reflecting state into a state in which these beams are not reflected.

In this way realization of the selector arrangement is possible in an especially easy manner.

According to a further embodiment of the present invention, the above object is solved by a stereoscopic microscope for imaging an object that can be placed in an optic plane of the stereoscopic microscope. The stereoscopic microscope then provides at least one pair of imaging beam paths and comprises an imaging system with several optical elements, wherein the several optical elements comprise a plurality of lenses and a plurality of deflecting elements for deflecting the at least one pair of imaging beam paths, wherein the deflecting elements each comprise at least one mirror surface. Further, the at least one pair of imaging beam paths is reflected at a first mirror surface, a second mirror surface, a third mirror surface and a fourth mirror surface, in sequence. The first mirror surface and the fourth mirror surface include an angle from 70° to 110°, and especially 90°, relative to one another. Further, the second mirror surface and the third mirror surface include an angle from 70° to 110°, and especially 90°, relative to one another. Furthermore, the plurality of lenses are configured such that the object plane of the stereoscopic microscope is imaged into an intermediate image, which is arranged in the beam path of the imaging system in between the first mirror surface and the fourth mirror surface.

In this respect, the angle included in between the respective mirror surfaces is considered to be the smallest angle at which two straight lines intersect, which respectively are orthogonal on one of the two planes defined by the respective mirror surfaces. According to an exemplary embodiment, the deflecting elements each comprise exactly one mirror surface. According to a further exemplary embodiment, at least one deflecting element comprises exactly two mirror surfaces. According to a further exemplary embodiment, no deflecting element comprises more than two mirror surfaces. According to a further exemplary embodiment, the plurality of lenses are configured such that the intermediate image is common to both imaging beam paths of each pair of imaging beam paths.

Configuration of the plurality of lenses of the imaging system of the stereoscopic microscope to arrange the intermediate image of the two imaging beam paths in between the first mirror surface and the fourth mirror surface can be achieved by using a conventional computer program for calculating optical systems, such as Code V for example. Such programs allow input of the location of the intermediate image of the imaging beam paths and output the optical parameters of the used optical lenses that are necessary to achieve this.

Due to the above arrangement of the mirror surfaces, which together optically act as a Porro prism system of the second kind, the stereoscopic microscope has an especially compact and simple structure. The deflection causes an exchange of pupils and image inversion and thus corrects an exchange of pupils and image inversion caused by the plurality of lenses of the stereoscopic microscope.

According to an embodiment, the first mirror surface and the second mirror surface can include an angle of between 40° to 80°, and especially 60°, relative to one another.

According to an embodiment, the beam paths in between the second mirror surface and the third mirror surface are free of lenses.

According to a further exemplary embodiment, the intermediate image is located in the beam path in between the third mirror surface and the fourth mirror surface.

Thus, the intermediate image of the stereoscopic microscope is located within a Porro prism system of the second kind formed by the four mirror surfaces that are arranged in sequence along the imaging beam paths.

Furthermore, a plurality of lenses of the imaging system can be arranged in between the first mirror surface and the intermediate image, and this plurality of lenses can be commonly traversed by both imaging beam paths of the at least one pair of imaging beam paths.

In this case, it can be advantageous if the plurality of lenses are arranged along one common optical axis and at least two lenses are displaceable relative to one another along this common optical axis.

Thus, it is guaranteed by suitable choice of the system data of the lenses that the at least one pair of imaging beam paths automatically includes a stereoscopic angle in the optic plane, even after relative displacement of the at least two lenses along the optical axis.

Furthermore, the at least two lenses may be displaceable relative to one another along the optical axis to vary a distance from the object plane of the stereoscopic microscope and/or a magnification of the image.

According to an embodiment, the first mirror surface, the second mirror surface, the third mirror surface, and the fourth mirror surface are arranged such that they form a Porro prism system of the second kind with respect to the at least one pair of imaging beam paths.

According to a further embodiment of the present invention, a microscope for imaging an object that can be placed in an object plane of the microscope is proposed, wherein the microscope provides at least one, and especially exactly one, imaging beam path. The microscope comprises at least one deflecting element with a mirror surface, as well as an imaging system comprising several optical elements, wherein the several optical elements comprise a plurality of lenses, and wherein the several optical elements are configured such that a plane defined by a pupil of the at least one imaging beam path is located neighboring the mirror surface and intersects the mirror surface of the at least one deflecting element, or is located with a distance from the mirror surface. In this respect, the distance is smaller than 1.5 times, and especially smaller than 1.0 times, and further especially smaller than 0.5 times, a diameter of a lens of the plurality of lenses that is located next to the mirror surface along the at least one imaging beam path. Furthermore, in the present application the term "neighboring" is interpreted in a way that a respective distance is smaller than 1.5 times, and especially smaller than 1.0 times, and further especially smaller than 0.5 times, a diameter of a lens of the plurality of lenses that is located next to the mirror surface along the at least one imaging beam path. According to an alternative embodiment "neighboring" denotes that a distance is not larger than 10 cm, and especially not larger than 5 cm, and especially not larger than 2 cm, and further especially not larger than 1 cm, and further especially, not larger than 0.5 cm.

Herein the distance in this embodiment is measured in the same manner as described above. The location of an image of a pupil in the vicinity of a lens of the imaging system provides degrees of freedom with respect to a possible combination of the microscope with a further apparatus, such as an illumination system or a medical apparatus such as an endoscope or surgical instrument.

According to an exemplary embodiment, the at least one imaging beam path in between the mirror surface of the deflecting element and the object plane of the microscope is free of optically effective elements. Reference is made to the above definition of optically effective elements.

According to a further exemplary embodiment, the several optical elements of the imaging system further comprise the at least one deflecting element, and the mirror surface of the at least one deflecting element is configured for folding the at least one imaging beam path. Consequently, the mirror surface is part of the imaging system.

It then can be advantageous if the microscope further provides a secondary beam path, which is located neighboring the mirror surface of the at least one deflecting element, or which traverses the mirror surface in an area outside of a maximal beam cross-sectional area of the at least one imaging beam path on the mirror surface. This location guarantees that the beams guided in the imaging beam paths are not deteriorated by beams guided in the secondary beam path. According to an embodiment, a distance in between the mirror surface and the secondary beam path is a shortest connection of an outer edge of the mirror surface and the secondary beam path.

According to a further exemplary embodiment, the microscope further comprises at least one pipe, that is located neighboring the mirror surface of the at least one deflecting element, or that traverses the mirror surface in an area outside the maximal beam cross-sectional areas. This arrangement guarantees that beams guided in the imaging beam paths are not deteriorated by the pipe. This pipe can be used for guiding surgical instruments for example.

According to an exemplary embodiment the secondary beam path can be guided in the pipe. Thus the pipe can be part of an endoscope, for example.

According to an alternative exemplary embodiment the microscope further provides at least one secondary beam path and the mirror surface of the at least one deflecting element is configured for folding the at least one secondary beam path. Thus, according to this embodiment the mirror surface is not part of the imaging system but is guiding the secondary beam path.

In this case it can be advantageous if a beam bundle of the at least one imaging beam path defines a beam cross-sectional area in the plane defined by the pupil, and if the mirror surface of the at least one deflecting element is located neighboring the beam cross-sectional area of the at least one imaging beam path, wherein the beam cross-sectional area is free of the mirror surface of the at least one deflecting element. This allows a location of the mirror surface, and thus of the secondary beam path, as close as possible to the at least one imaging beam path, wherein a deterioration of beams guided in the imaging beam path by the mirror surface is always reliably avoided for each working distance and each zoom factor of the microscope.

According to a further exemplary embodiment the microscope further comprises an illumination system with a beam source and an imaging optics for illuminating the optic plane and/or an infrared observing system with an infrared imaging optics and/or a laser with a beam guiding system, which provides the at least one secondary beam path.

According to a further exemplary embodiment the microscope further comprises an observing system with an imaging optics, which provides the at least one secondary beam path.

It may provide advantages if the plurality of lenses is arranged along one common optical axis, and if at least two lenses are displaceable relative to one another along the optical axis.

According to a further exemplary embodiment, the microscope further comprises a special robotic mounting with at least three degrees of freedom for the beam source and illumination optics and/or the infrared observing system with the infrared imaging optics and/or the laser with the beam guiding system and/or the imaging optics providing the at least one secondary beam path. This allows an easy and exact orientation of the secondary beam path with respect to an object that can be placed in the optic plane, independently from the stereo microscope and microscope, respectively.

According to a further exemplary embodiment the microscope comprises a special robotic mounting with at least three degrees of freedom, to allow a flexible orientation arrangement of the microscope or stereoscopic microscope, respectively.

BRIEF DESCRIPTION OF THE DRAWINGS

In the following, embodiments of the present invention are described by reference to the accompanying drawings. In the drawings like or similar reference signs are used to refer to like or similar elements as far as possible. There shows FIG. 1A schematically shows a beam path through an arrangement of selected elements of a stereoscopic microscope according to a first embodiment of the present invention, which arrangement is unfolded in one plane, FIG. 1B schematically shows a top view of selected elements of a stereoscopic microscope according to the first embodiment, FIG. 1C schematically shows a side view of the selected elements of the stereoscopic microscope according to the first embodiment, FIG. 1D schematically shows a perspective view of selected elements of the stereoscopic microscope according to the first embodiment, FIG. 2A schematically shows a top view of a mirror surface of a deflecting element of the stereoscopic microscope according to the first embodiment in a first operating state, FIG. 2A' schematically shows a beam path corresponding to FIG. 2A through an arrangement of selected elements of the stereoscopic microscope, FIG. 2B schematically shows a top view on the mirror surface of the deflecting element of the stereoscopic microscope according to the first embodiment in a second operating state, FIG. 2B' schematically shows a beam path through the arrangement of selected elements of the stereoscopic microscope that corresponds to FIG. 2B, FIG. 3 schematically shows a beam path through an arrangement of selected elements of a stereoscopic microscope according to a second embodiment of the present invention which arrangement is unfolded in one plane, FIG. 4A schematically shows a beam path through an arrangement of selected elements of a stereoscopic microscope according to a third embodiment of the present invention which arrangement is unfolded in one plane, FIG. 4B schematically shows a top view on a mirror surface of a deflecting element of the stereoscopic microscope according to the third embodiment in a first operation state, FIG. 4C schematically shows a top view on the mirror surface of the deflecting element of the stereoscopic microscope according to the third embodiment in a second operating state, FIG. 5 schematically shows a beam path through an arrangement of selected elements of a stereoscopic microscope according to a fourth embodiment of the present invention which arrangement is unfolded in one plane, FIG. 6A schematically shows a perspective view of selected elements of a stereoscopic microscope according to a fifth embodiment of the present invention, FIG. 6B schematically shows a top view of a mirror surface of a deflecting element of the stereoscopic microscope according to the fifth embodiment, FIG. 6C schematically shows a top view on a mirror surface of a deflecting element of the stereoscopic microscope according to a variation of the fifth embodiment, FIG. 6D schematically shows a top view on a mirror surface of a deflecting element of a microscope according to a further variation of the fifth embodiment of the present invention, FIG. 7 schematically shows a beam path through an arrangement of selected elements of a microscope having only one imaging beam path according to a sixth embodiment of the present invention which arrangement is unfolded in one plane, FIG. 8A schematically shows the basic structure of a stereoscopic microscope according to the prior art, and FIG. 8B schematically shows a perspective view of selected elements of the stereoscopic microscope of the prior art.

DETAILED DESCRIPTION OF THE INVENTION

In the following a first embodiment of the present invention is explained by reference to FIGS. 1A, 2A, 2A', 2B and 2B'.

Figure 1A:
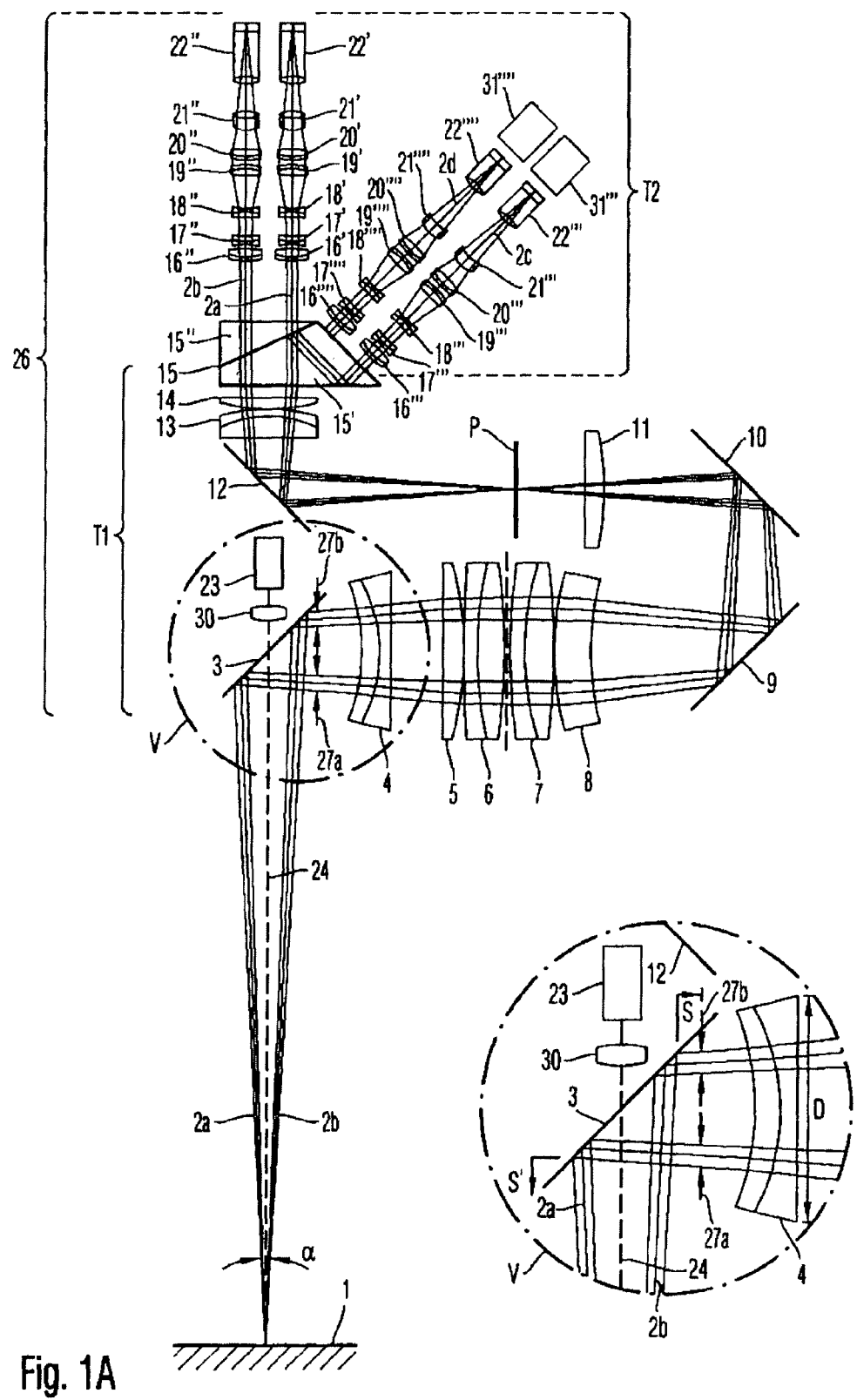
Figure 1D:
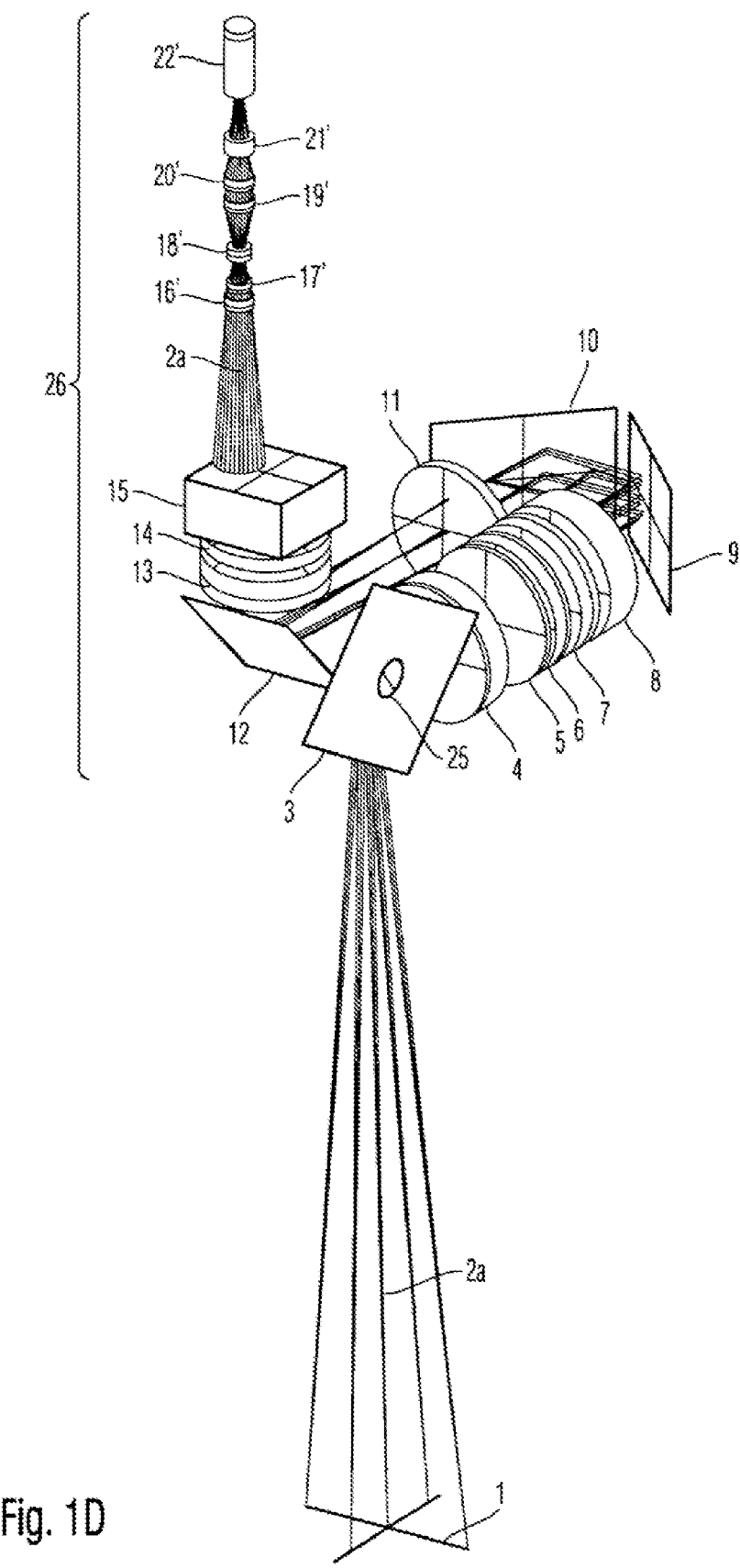

FIG. 1A schematically shows a beam path through an arrangement of selected elements of a stereoscopic microscope according to a first embodiment of the present invention; the arrangement is unfolded in one plane. FIGS. 1B, 1C and 1D schematically show different views of selected elements of the stereoscopic microscope according to this embodiment.

The stereoscopic microscope according to the first embodiment comprises an optical imaging system 26, providing two pairs of imaging beam paths 2a, 2b as well as 2c, 2d. The imaging beam paths 2a and 2b as well as the imaging paths 2c and 2d respectively intersect pairwise in the object plane 1 and respectively include pairwise a stereoscopic angle .alpha. different from zero. The stereoscopic angle included in the object plane 1 by the first pair of imaging beam paths 2a, 2b can be different from the stereoscopic angle included in the object plane 1 by the second pair of imaging beam paths 2c, 2d. However, the stereoscopic angles that are included in the object plane 1 by the imaging paths 2a, 2b as well as 2c, 2d may even be equal. In FIG. 1A the stereoscopic angle α=4°. To enhance the clarity of the figures, imaging beam paths 2c and 2d are not completely shown.

The imaging system 26 is formed by a first optical subsystem T1 and a second optical subsystem T2, each comprising a plurality of optical elements.

The first subsystem T1 comprises a first optical deflecting element with a first optical mirror surface 3, a first, second, third, fourth and fifth optical lens 4, 5, 6, 7 and 8, a second optical deflecting element with a second optical mirror surface 9, a third optical deflecting element with a third optical mirror surface 10, a sixth optical lens 11, a fourth optical deflecting element with a fourth optical mirror surface 12, a seventh and eighth optical lens 13 and 14 and parts of a prism 15', 15" of a beam splitter arrangement 15. In this respect, the lenses 4, 5, 6, 7, 8, 11, 13 and 14 of the first subsystem T1 are commonly traversed by the four imaging beam paths 2a, 2b, 2c and 2d.

The imaging beam paths 2a, 2b, 2c and 2d are reflected by the first mirror surface 3, the second mirror surface 9, the third mirror surface 10, and the fourth mirror surface 12, in sequence, and thus folded. As can be seen especially well in FIG. 1D, the first mirror surface 3 and the fourth mirror surface 12 include an angle of 90° relative to one another. The second mirror surface 9 and the third mirror surface 10 also include an angle of 90° relative to one another.

However the present invention is not restricted to an angle of 90°. In fact, the first mirror surface 3 and the fourth mirror surface 12, as well as the second mirror surface 9 and the third mirror surface 10, pairwise may include an angle of preferably 70° to 110°.

Further, the first mirror surface 3 and the second mirror surface 9 include an angle of 60° relative to one another.

However, the invention is not restricted to an angle of 60°. In fact, the first mirror surface 3 and the second mirror surface 9 may include an angle of 40° to 80° relative to one another.

In the case that the first mirror surface 3 and the fourth mirror surface 12 and/or the second mirror surface 9 and the third mirror surface 10 and/or the first mirror surface 3 and the second mirror surface 9 include an angle different from 90°, for example, 60° relative to one another, this may possibly cause an additional image rotation. This image rotation may be corrected, for example, analytically in a digital way and/or in an optical way by using correspondingly adjusted mirrors or prisms, respectively (not separately shown) if necessary. The first, second, third and fourth mirror surfaces 3, 9, 10, 12, respectively, may be used directly for the correction.

In this respect, the angle that is pairwise included in between the respective mirror surfaces 3, 9, 10, 12 is considered to be the smallest angle by which two straight lines intersect, that each are orthogonal to one of the two planes which are defined by the two respective mirror surfaces.

Due to this arrangement, the first to four mirror surface 3, 9, 10 and 12 of the first to fourth deflecting elements optically act as a Porro-System of the second kind. This means that the first to fourth mirror surface 3, 9, 10 and 12 cause an image inversion, as well as an exchange of pupils. The first, second, third, fourth and fifth lens 4, 5, 6, 7 and 8 are located in between the first deflecting element having the first mirror surface 3 and the second deflecting element having the second mirror surface 9. The sixth lens 11 is located in between the third deflecting element having the third mirror surface 10 and the fourth deflecting element having the fourth mirror surface 12, the seventh and eighth lens 13 and 14 are located in between the fourth deflecting element having the fourth mirror surface 12 and the beam splitter arrangement 15.

Thus, the beam path in between the second deflecting element having the second mirror surface 9 and the third deflecting element having the third mirror surface 10 is free from optical lenses.

Then the first, second, third and fourth deflecting element, having the first, second, third and fourth mirror surface 3, 9, 10 and 12, as well as the first to eighth lens 4 to 8, 11, 13 and 14, are configured such that pupil planes 27a, 27b of the imaging beam paths 2a, 2b, 2c and 2d are located in the direct vicinity of the first mirror surface 3 of the first deflecting element. Thus, the pupil planes 27a and 27b are located in between the first lens 4 and the object plane 1 in the vicinity of the first deflecting element having the first mirror surface 3. Further, no optical elements are provided in between the mirror surface 3 of the first deflecting element and the object plane 1 of the stereoscopic microscope.

According to an alternative embodiment that is not separately shown in the Figures, it is however possible to arrange elements that are optically non-effective, such as cover glasses, filters or the like, in between the mirror surface 3 of the first deflecting element and the object plane 1. In this respect, "optically non-effective" means that an addition or removal of the element arranged in between the mirror surface of the deflecting element and the object plane of the stereoscopic microscope causes variation of the working distance of the stereoscopic microscope by less than 5%, preferable less than 2%, and further preferably by less than 1%, and still further preferably by less than 0.5%.

As shown in the enlarged section V of FIG. 1A, the lenses 4, 5, 6, 7, 8, 11, 13 and 14 of the first subsystem T1 are configured in this embodiment such that the pupil planes 27a and 27b intersect the at least one first mirror surface 3 of the first deflecting element.

In this respect, pupil plane 27a and 27b is considered to be the curved or flat plane (optical surface) in which central or main beams of a beam bundle guided by imaging beam paths 2a and 2b of the imaging system 26 intersect each other, wherein the central or main beams are emitted by different object points in the object plane 1.

This arrangement of the pupil planes 27a and 27b causes that beam bundles of the imaging beam paths 2a, 2b, 2c and 2d respectively define beam cross-sectional areas 28a, 28b, 28c and 28d on the first mirror surface 3 of the first deflecting element, which are at least pairwise separated by a distance from one another and which thus do not, at least pairwise, overlap. This is illustrated in FIGS. 2A and 2B which schematically show a top view on the first mirror surface 3 of the first deflecting element in a first and second operating state. In this respect, FIGS. 2A' and 2B' schematically show the first and second operating state with beam paths relating to different magnifications.

However, according to the invention, it is not absolutely necessary that the pupil planes 27a and 27b intersect the first mirror surface 3 in order that the beam cross-sectional areas 28a, 28b, 28c and 28d define a first region on the first mirror surface 3, which is always free of the beam cross-sectional areas 28a, 28b, 28c and 28d. It is sufficient if the pupil planes 27a and 27b of the imaging beam paths 2a and 2b are located with a distance S, S' from the at least one mirror surface 3, wherein the distance S, S' is smaller than 1.5 times, especially smaller than 1.0 times, and further especially smaller than 0.5 times a diameter D of the respective lens which is located closest to the first mirror surface 3 along the imaging beam paths 2a, 2b, 2c and 2d. In the FIGS. 1A, 1B, 1C and 1D this is the first lens 4. The distance S, S' is measured starting from a surface of the first mirror surface 3 which is maximally covered by the beam cross-sectional areas 28a, 28b, 28c and 28d and in parallel to the beam path. The displacement of the pupil plane can also occur towards the second deflecting element with the second mirror surface 9, as well as towards the object plane 1. This is symbolized by arrows S, S' in the magnified view V of FIG. 1A. Further, the first to fourth deflecting element with the first to fourth mirror surface 3, 9, 10 and 12, as well as the first to eighth lens 4 to 8, 11, 13 and 14, are configured such that the object plane 1 of the stereoscopic microscope is imaged into an intermediate image P within the first subsystem T1. In the first embodiment shown in FIGS. 1A and 1B the intermediate image P is located in a beam path of the imaging system 26 in between the third mirror surface 10 of the third deflecting element and the fourth mirror surface 12 of the fourth deflecting element. In more detail, the intermediate image P is located in between the sixth lens 11 and the fourth mirror surface 12 of the fourth deflecting element 12 in this embodiment. Thus the intermediate image P is located in between the sixth lens 11 and the seventh lens 13 of the first subsystem T1. Consequently, the first, second, third, fourth, fifth and sixth lens 4 to 8 and 11 are located in between the first mirror surface 3 of the first deflecting element and the intermediate image P.

In this respect, the intermediate image P is considered to be the plane that is conjugated to the object plane, which plane may even be curved, in which partial beams of the beam path intersect, which partial beams are emitted by one common point but with different angles in the object plane 1.

Although in the first embodiment the intermediate image P explicitly is located in between the sixth lens 11 and the fourth mirror surface 12, the intermediate image P may generally be located in the beam path of the imaging system 26 in between the first mirror surface 3 of the first deflecting element and the fourth mirror surface 12 of the fourth deflecting element.

As is evident from FIGS. 1A, 1B, 1C and 1D, the lenses 4 to 8 of the first subsystem T1 that are commonly traversed by both pairs of imaging beam paths 2a, 2b, 2c and 2d are arranged along one common optical axis. The first lens 4 is displaceable relative to the second lens 5, and the third lens 6 is displaceable relative to the fourth lens 7 along the optical axis, to vary a distance of the object plane 1 from the stereoscopic microscope, and thus a working distance and a magnification of the image of an object that can be placed in the object plane 1. At the same time, it is guaranteed by suitable choice of the system data of these optical lenses 4, 5, 6 and 7, that the imaging beam paths 2a and 2b as well as 2c and 2d pairwise include a stereoscopic angle in the object plane even after displacement of the lenses.

The second subsystem T2 of the imaging system 26 also comprises a plurality of optical elements 16' to 22', 16" to 22", 16''' to 22''' and 16'''' to 22'''', in which the imaging beam paths 2a, 2b, 2c and 2d are guided separately, which is different from the first subsystem T1. This means that the optical lenses 16' to 21', 16" to 21", 16''' to 21''' and 16'''' to 21'''' are each traversed by, respectively, one imaging beam path 2a, 2b, 2c or 2d.

Each imaging beam path 2a, 2b, 2c and 2d of the second subsystem T2 that is separately guided, comprises a camera adaptor 22', 22", 22''' and 22'''' for a camera. In FIG. 1A, only the cameras 33' and 33'''' are explicitly shown. A stereoscopic camera may be used instead of separate cameras 31''' and 31''''. Further, instead of the camera adaptors 22', 22", 22''' and 22'''' alternatively, or additionally, one (not explicitly shown) tube optics with oculars for direct visual observation may be provided at the end of one or plural or all, respectively, imaging beam paths 2a, 2b, 2c and 2d. Further, three distances in between the four lenses 16' to 19', 16" to 19", 16''' to 19''' and 16'''' to 19'''', respectively, that are located along one common optical axis in a respective imaging beam path 2a, 2b, 2c and 2d are displaceable relative to one another, to vary the magnification of the image caused by the second subsystem T2 in the respective imaging beam paths 2a, 2b, 2c and 2d.

As the first subsystem T1 causes an imaging of the object that can be placed in the object plane 1 into an intermediate image P, the second subsystem T2 causes an imaging of the intermediate image P with variable magnification.

For pairwise separation of the imaging beam paths 2a, 2b, 2c and 2d a physical beam splitter 15 is provided in the first embodiment, which has a partially transparent mirror surface, which is traversed by a first pair of imaging beam paths 2a and 2b and on which a second pair of imaging beam paths 2c and 2d is reflected.

Furthermore, the stereoscopic microscope according to the first embodiment provides a secondary beam path 24, which traverses the first mirror surface of the first deflecting element in a region in between the beam cross-sectional areas 28a, 28b, 28c and 28d of the imaging beam paths 2a, 2b, 2c and 2d. This is especially evident from FIGS. 2A and 2B. In this respect, the first deflecting element, and thus even the first mirror surface 3, has a cut 25 in a region in between the beam cross-sectional areas 28a, 28b, 28c and 28d that is traversed by the secondary beam path 24.

Alternatively, the first mirror surface 3 of the first deflecting element may even have a full, or at least a partial, transparency in the region in between the beam cross-sectional areas 28a, 28b, 28c and 28d, for example. This means that a reflectivity of the first mirror surface for beams guided by the imaging beam paths 2a, 2b, 2c and 2d of a first range of wavelength is smaller in a region in between the beam cross-sectional areas 28a, 28b, 28c and 28d, than the reflectivity of the first mirror surface 3 for the beams guided in the imaging beam paths 2a, 2b, 2c and 2d of the first range of wavelengths in the region of the beam cross-sectional areas 28a, 28b, 28c and 28d.

In the case when the secondary beam path 24 is configured for imaging beams of a second range of wavelengths, which is different from the first range of wavelengths, of the beams guided by the imaging beam paths 2a, 2b, 2c and 2d, the first mirror surface 3 of the first deflecting element may even have a dichroitic property, for example, to be traversed by the secondary beam path 24. This means that, at least in a region, the first mirror surface 3 has a reflectivity for beams guided in the imaging beam paths 2a, 2b, 2c and 2d of the first range of wavelengths which is higher than the reflectivity for the beams guided by the secondary beam path 24 of the second range of wavelengths.

In FIG. 1A, the secondary beam path is formed by an illumination optics 30 of an illumination system, wherein the illumination system further comprises a beam source 23. Thus, the stereoscopic microscope shown in FIG. 1A has a 0° illumination for an object that can be placed in the object plane 1. This illumination system is not part of the imaging system 26 or of the first subsystem T1.

Alternatively, in addition to or instead of the illumination system comprising the illumination optics 30 and the beam source 23, an infrared observing system with an infrared imaging optics could be provided, wherein the infrared imaging optics provides the secondary beam path 24. This provides a 0° infrared observation of an object that can be placed in the object plane 1. Consequently, a deterioration of the infrared beams received by the infrared observing system due to the temperature of optical elements of the imaging system of the stereoscopic microscope is kept low.

Furthermore, in addition or instead of the illumination system comprising the illumination optics 30 and the beam source 23, a laser with a beam guiding system can be provided, which provides the secondary beam path 24. Such a laser allows therapeutic treatment for cancer, for example.

In the first embodiment described above, the first, second, third and fourth deflecting elements, respectively, are an optical mirror. Alternatively the deflecting elements may even be prisms having at least one mirror surface. Furthermore, the first, second, third and fourth deflecting element may even have plural mirror surfaces for deflecting the imaging beam paths 2a, 2b, 2c and 2d, if appropriate. Further, fewer or more than two pairs of imaging beam paths may be provided.

To enhance the clarity of the Figures only one imaging beam path 2a of the second subsystem T2 is shown in FIGS. 1B to 1D. Further, illustration of the illumination system has been avoided. To clarify the actual spatial arrangement of the basic elements of the stereoscopic microscope according to the first embodiment described above, and in contrast to the arrangement which is unfolded in one plane in FIG. 1A, FIG. 1D schematically shows a perspective view of the stereoscopic microscope.

Figure 2A:
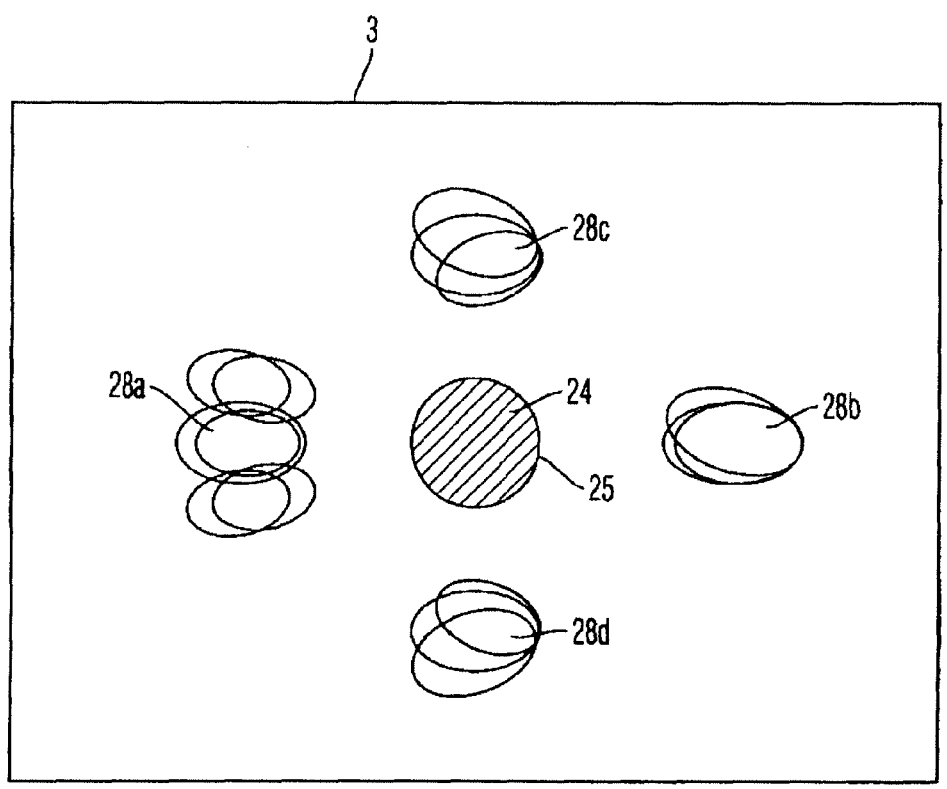
Figure 2A:
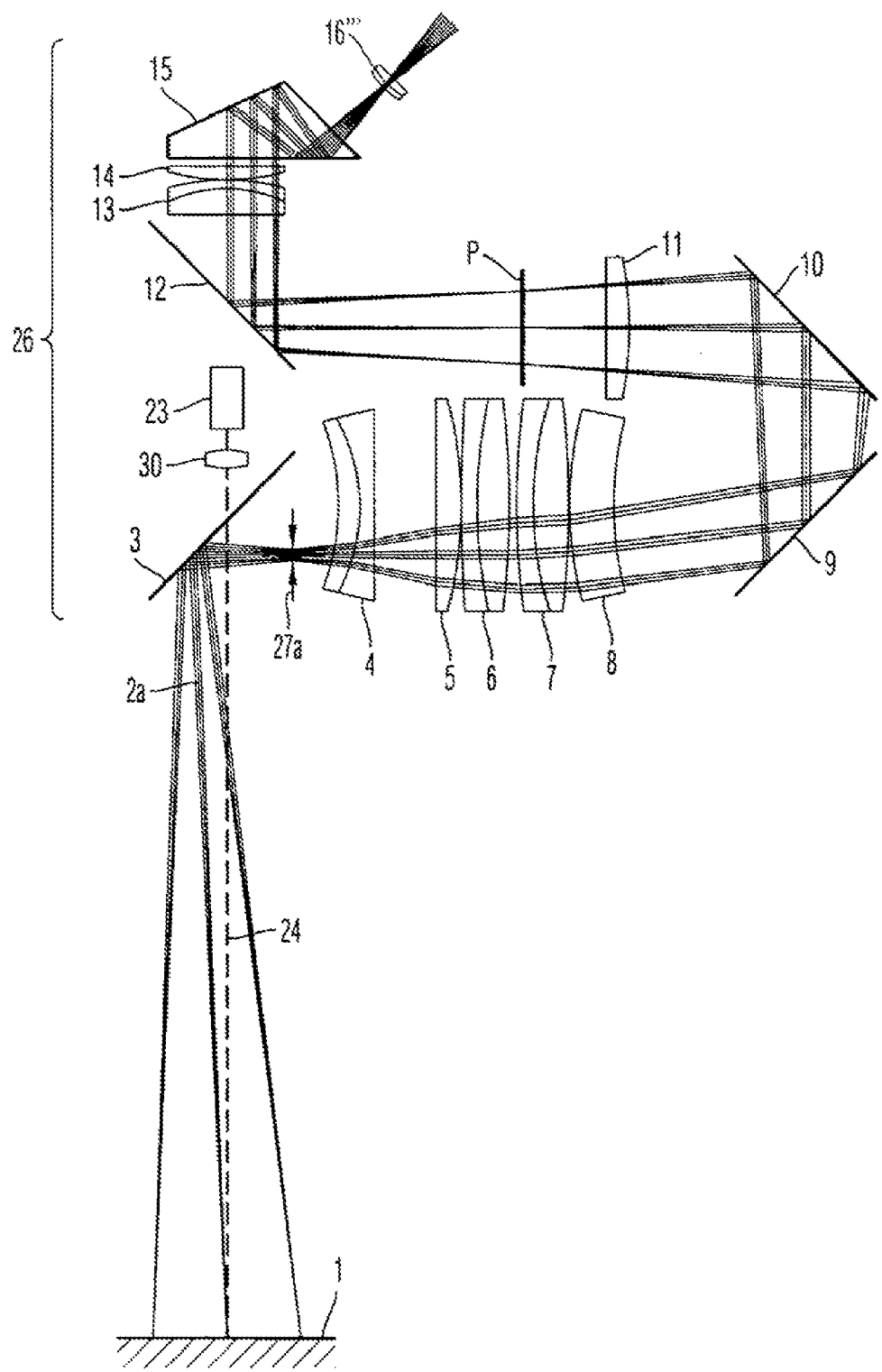
Figure 2B:
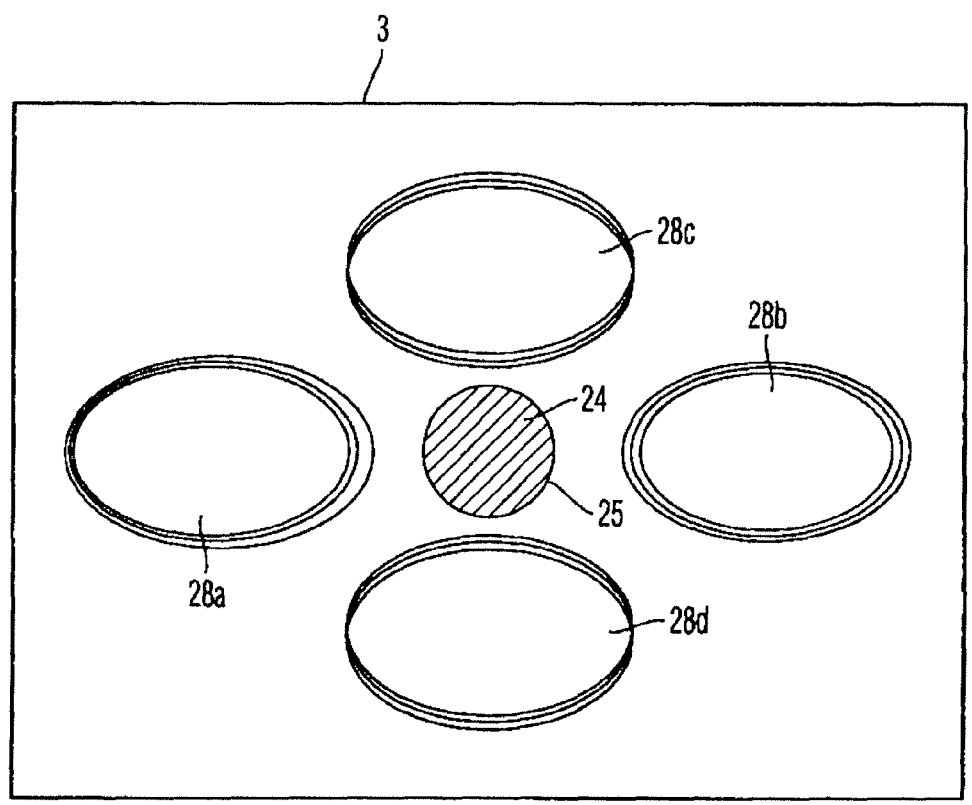
Figure 2B:
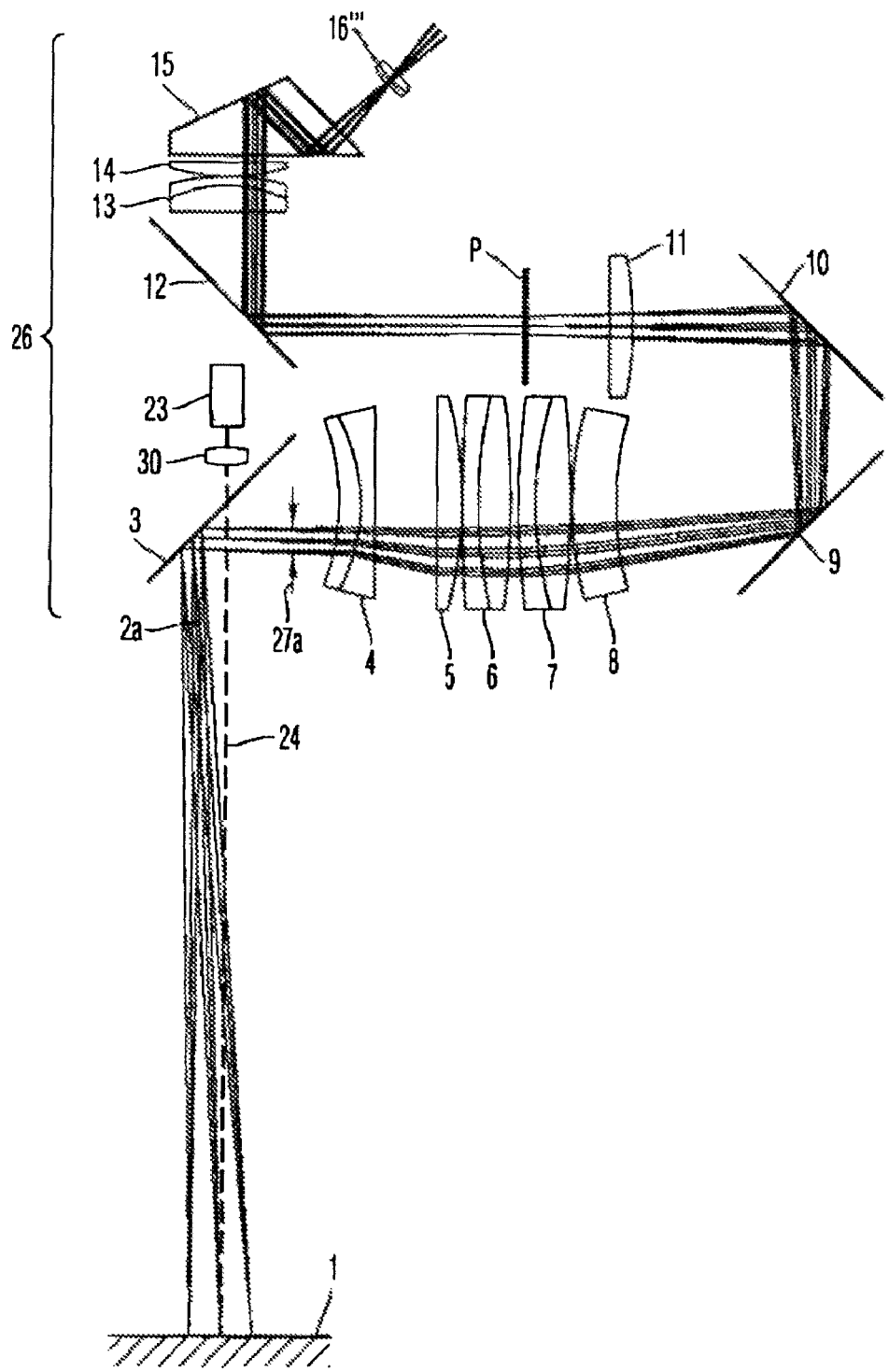

In FIGS. 2A and 2B a schematic top view of a first mirror surface 3 of the first deflecting element is shown. The beam cross-sectional areas 28a, 28b, 28c and 28d of the beam bundles guided by the imaging beam paths 2a, 2b, 2c and 2d, defined on the first mirror surface 3 for different operating states, and thus different imaging magnifications of the stereoscopic microscope, are also illustrated.

As is evident from FIGS. 2A and 2A', vignetting occurs, especially for a small zoom factor, as a consequence of the divergence of the beam bundles guided by the imaging beam paths 2a, 2b, 2c and 2d at small zoom factors. However, due to the proposed location of the pupil planes 27a, 27b it is guaranteed that even with rotation of the beam cross-sectional areas 28a, 28b, 28c and 28d to allow a free positioning of an observer in between the beam cross-sectional areas 28a, 28b, 28c and 28d, a region that is free from beam cross-sectional areas 28a, 28b, 28c and 28d is always maintained on the first mirror surface 3. In this region that is maintained free, a cut 25 traversed by the secondary beam path 24 is located in FIGS. 2A and 2B.

Thus a free positioning of an observer with respect to the stereoscopic microscope is possible by pairwise rotation of optical elements 16' to 22', 16" to 22", 16''' to 31''', and 16'''' to 31'''', respectively, as well as possible further optical elements of the second subsystem T2 (not shown in the Figures).

In summary the first embodiment that is shown in FIGS. 1A to 1D as well as 2A to 2B' explains and describes the basic structure of a digital surgical microscope for two observers, wherein the observers may be integrated by physical beam splitting by using a Bauernfeind-Prisma. Observation can be performed digitally as well as visually.

Figure 3:
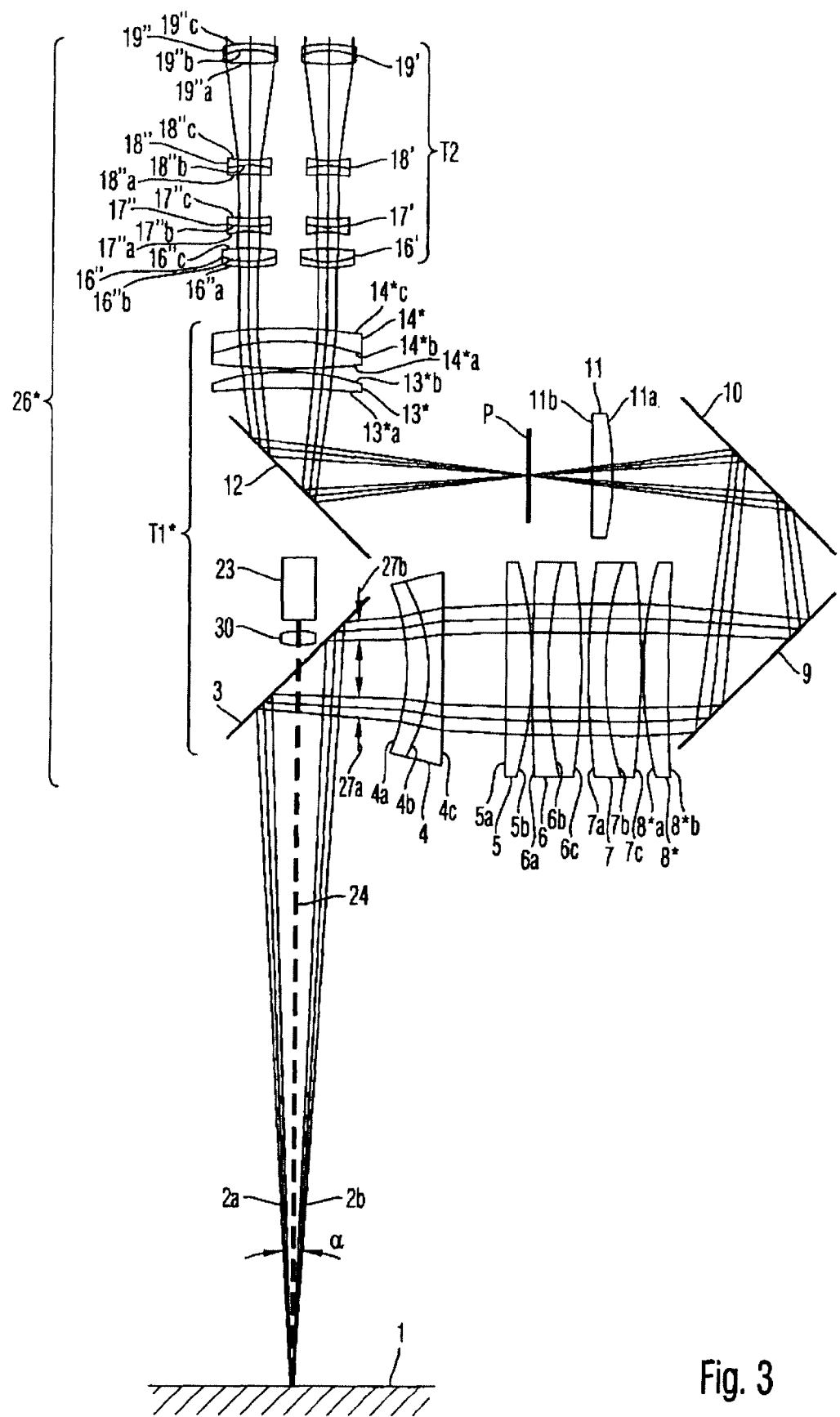

FIG. 3 schematically shows a beam path through an arrangement of selected elements of a stereoscopic microscope according to a second embodiment of the present invention, which arrangement is unfolded in one plane.

The second embodiment that is shown in FIG. 3 differs from the first embodiment that is shown in FIG. 1A especially by the fact that no physical beam splitter 15 is provided. The two stereoscopic observers are included in the first subsystem T1* by geometric beam splitting. In FIG. 3 only one stereoscopic imaging beam path is illustrated. Further, the system data of the optical lenses of the first subsystem T1*, and especially of the fifth, seventh and eighth lenses 8*, 13* and 14*, differ slightly from the first embodiment. The optical system data of the stereoscopic microscope shown in FIG. 3 are as follows:

| Surface | Radius [mm] | Thickness [mm] | Medium | Free Diameter [mm] |
|---|---|---|---|---|
| 19"c | 28.930 | | | 12.00 |
| | | 1.2 | LAFN7 | |
| 19"b | 15.052 | | | 11.8 |
| | | 3.0 | NPSK53 | |
| 19"a | −144.79 | | | 11.5 |
| | | 22.68 . . . 1.02 | Air | |
| 18"c | −35.928 | | | 10.0 |
| | | 1.2 | NBAF4 | |
| 18"b | 9.9568 | | | 10.0 |
| | | 2.0 | NSF6 | |
| 18"a | 19.467 | | | 9.5 |
| | | 11.5 . . . 11.5 | Air | |
| 17"c | −19.467 | | | 9.5 |
| | | 2.0 | NSF6 | |
| 17"b | −9.9568 | | | 10.0 |
| | | 1.2 | NBAF4 | |
| 17"a | 35.928 | | | 10.5 |
| | | 1.02 . . . 22.68 | Air | |
| 16"c | 144.79 | | | 11.5 |
| | | 3.0 | NPSK53 | |
| 16"b | −15.052 | | | 11.8 |
| | | 1.2 | LAFN7 | |
| 16"a | −28.930 | | | 12.0 |
| | | 20.0 | Air | |
| 14*c | 102.55 | | | 34.0 |
| | | 3.0 | LAFN7 | |
| 14*b | 50.047 | | | 34.0 |
| | | 6.0 | NFK51 | |
| 14*a | −197.88 | | | 34.0 |
| | | 1.0 | Air | |
| 13*b | 52.089 | | | 34.0 |
| | | 4.0 | NFK51 | |
| 13*a | 306.55 | | | 34.0 |
| | | 20.0 | Air | |
| 12 | Plane | | | Mirror |
| | | 65.805 | Air | |
| 11b | Plane | | | 30.0 |
| | | 4.0 | LAFN7 | |
| 11a | −116.05 | | | 30.0 |
| | | 38.195 | Air | |
| 10 | Plane | | | Mirror |
| | | 44.0 | Air | |
| 9 | Plane | | | Mirror |
| | | 23.0 | Air | |
| 8b | −392.46 | | | 48.0 |
| | | 6.0 | NFK51 | |
| 8a | −75.151 | | | 48.0 |
| | | 1.0 | Air | |
| 7c | 273.58 | | | 48.0 |
| | | 8.0 | NFK51 | |
| 7b | −68.282 | | | 48.0 |
| | | 4.0 | LAFN7 | |
| 7a | −151.48 | | | 48.0 |
| | | 2.0 . . . 18.0 | Air | |
| 6c | 238.24 | | | 48.0 |
| | | 7.0 | NPSK53 | |
| 6b | −93.039 | | | 48.0 |
| | | 4.0 | SF56A | |
| 6a | −332.28 | | | 48.0 |
| | | 0.1 | Air | |
| 5b | 107.96 | | | 46.0 |
| | | 5.0 | NSK16 | |
| 5a | Plane | | | 46.0 |
| | | 16.5 . . . 0.5 | Air | |
| 4c | Plane | | | 45.0 |
| | | 3.0 | NSSK8 | |
| 4b | 43.717 | | | 42.0 |
| | | 5.0 | NSF6 | |
| 4a | 66.970 | | | 40.0 |
| | | 22.0 | Air | |
| 3 | Plane | | | Mirror |
| | | 224.0 . . . 424.0 | Air | |

In summary, the second embodiment that is shown in FIG. 3 corresponds in basic parts to the first embodiment, while the physical beam splitter having a prism is replaced by a geometric beam splitter having deflecting mirrors or a free pathway, respectively. The embodiment shown in FIG. 3 also allows a free positioning of an observer with respect to the stereoscopic microscope by rotation of the optical elements 16' to 19', 16" to 19", and if applicable, further optical elements of the second subsystem T2.

Figure 4A:
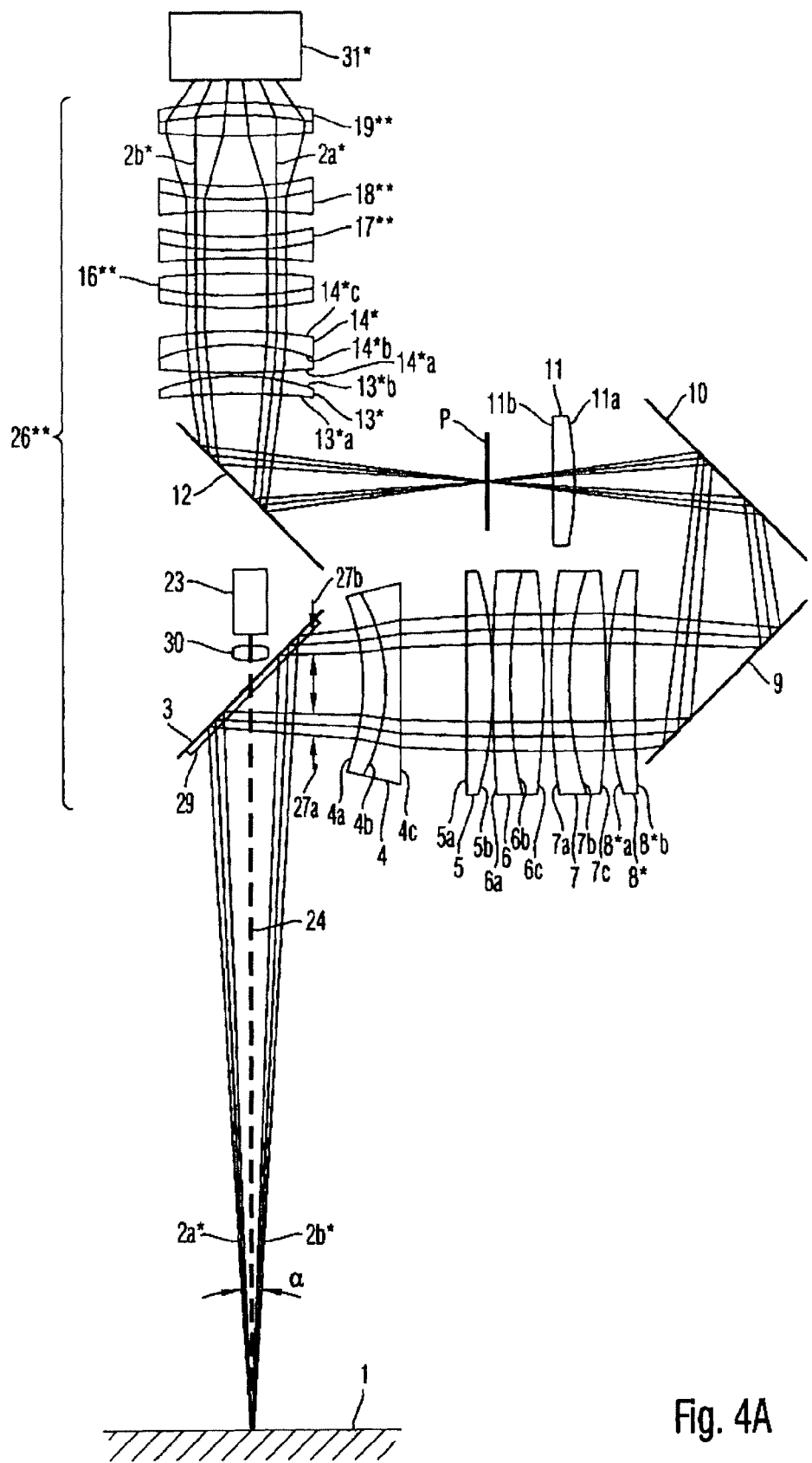

The arrangement of selected elements of a stereoscopic microscope according to a third embodiment of the present invention, which arrangement is unfolded in one plane and shown in FIG. 4A, differs from the second embodiment shown in FIG. 3 in that the imaging beam paths 2a and 2b commonly traverse all optical lenses.

Thus the imaging system 26 shown in FIG. 4A has no separation into two different subsystems. Furthermore, the optical lenses 16 to 19 of the imaging system 26 have optical system data that are different from the optical system data of the lenses 16" to 19" of the second embodiment.

For observing an object (not shown) that can be placed in the object lens 1 by the imaging system 26*, a digital camera 31* is provided. Furthermore, a selector arrangement is located neighboring the first mirror surface 3.

The selector arrangement and the camera 31* are electrically connected with a controller that is not shown in FIG. 4A. The selector arrangement is used for selecting a partial beam bundle 2a* or 2b* of a beam bundle guided by the imaging system 26**. These partial beam bundles 2a* and 2b* include a stereoscopic angle .alpha. in the object plane with one another and thus basically correspond to the imaging beam paths 2a and 2b described above.

In this respect, the selector arrangement is configured to displace a beam cross-section of at least one of the two partial beam bundles 2a* and 2b* relative to a beam cross-section of the total beam bundle guided by the imaging system 26**. This means that the selector arrangement that is located neighboring the first mirror surface 3 selectively selects one of the beam cross-sectional areas 28a or 28b defined on the first mirror surface 3 by the partial beam bundles 2a* and 2b*.

Figure 4B:
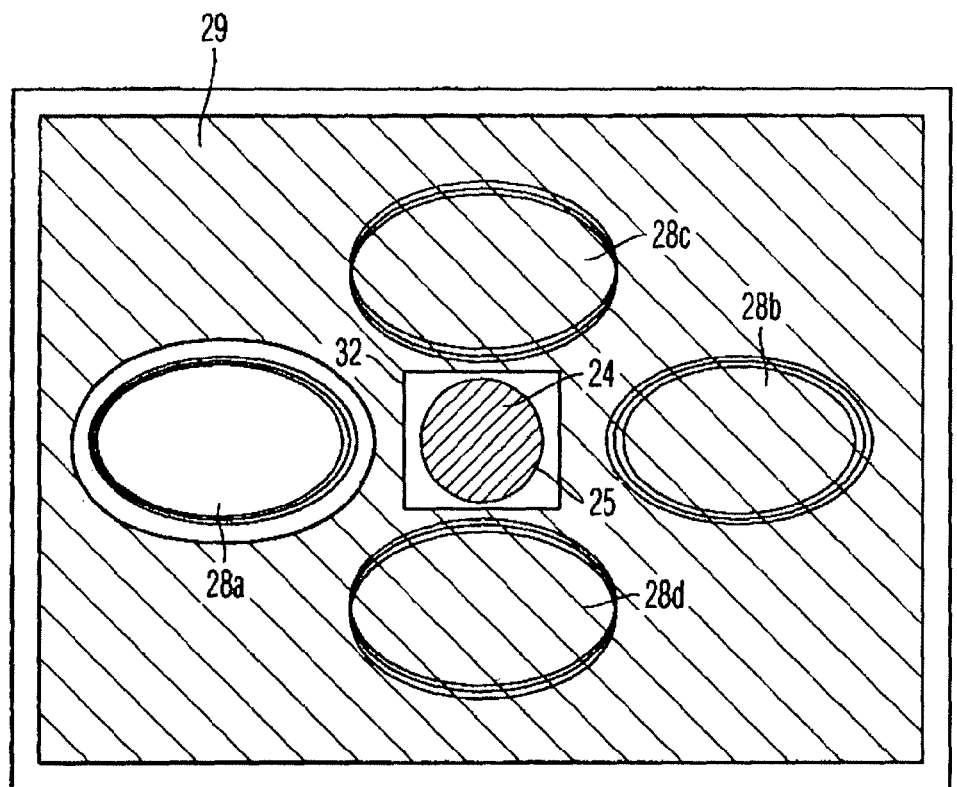
Figure 4C:
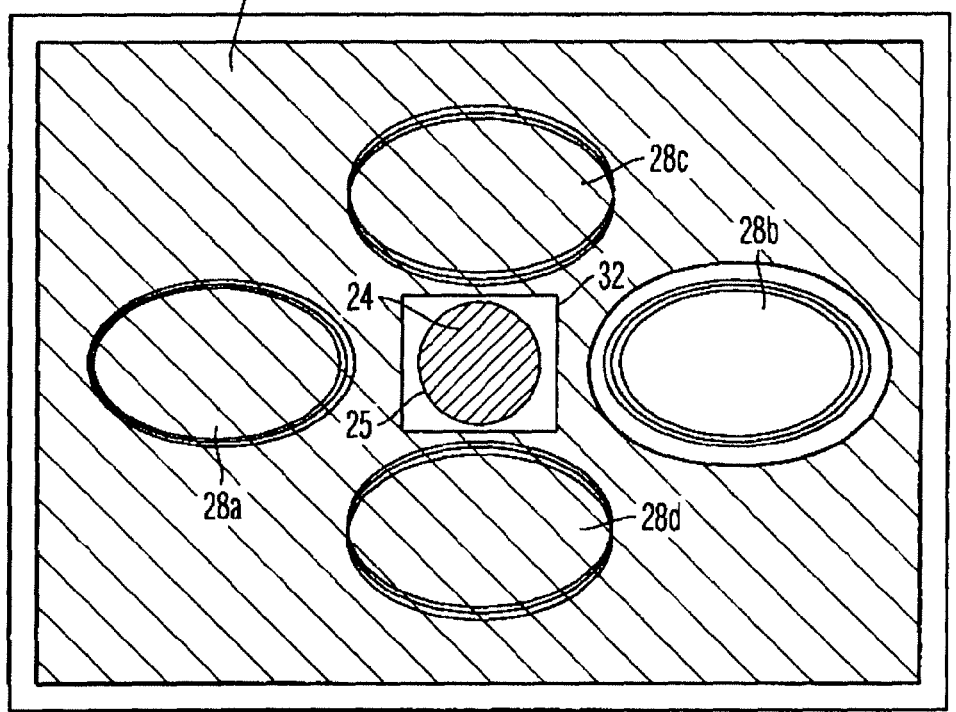

In FIGS. 4B and 4C a switchable aperture 29 is located neighboring the first mirror surface 3 of the first deflecting element. The switchable aperture 29 selectively transmits the beam cross-sectional area 28a and thus the first partial beam bundle 2a* (FIG. 4B), or the beam cross-sectional area 28b, and thus the second partial beam bundle 2b* (FIG. 4C). Furthermore, the aperture 29 has an opening 32, to allow a secondary beam, guided by the secondary beam path 24, to traverse without being effected. In FIGS. 4B and 4C regions of the aperture 29 that are not transparent are diagonally shaded.

As an alternative to the provision of the aperture 29 neighboring the first mirror surface 3 of the first deflecting element, the selector arrangement may even be integrated into the first deflecting element. In this case the first mirror surface 3 has a switchable region according to an embodiment. Thus the first mirror surface 3 selectively reflects the beam cross-sectional area 28a, and thus the first partial beam bundle 2a* or the beam cross-sectional area 28b, and thus the second partial beam bundle 2b*. To achieve this, according to an embodiment, the mirror surface 3, in its switchable region, has a plurality of mirror elements that are separately switchable from a state in which they reflect imaging beams of the partial beam bundles 2a* and 2b*, respectively, to a state in which they do not reflect the imaging beams of the partial beam bundles 2a* and 2b*.

By taking two pictures, using camera 31, of partial beam bundles 2a* and 2b* in sequence, which beam cross-sections are displaced relative to one another by a predefined distance by the selector arrangement, it is possible to form a stereoscopic total image. A free rotation of the stereoscopic total image can even be achieved by corresponding control of the selector arrangement. This is described in detail in the German patent application DE 103 00 925 A1, the content of which is completely incorporated by reference.

In summary, the third embodiment illustrated in FIGS. 4A to 4C explains and describes a pure digital generation of images by using a large optics for a stereoscopic generation of images and an electronic control of the stereoscopic pupils and thus the stereoscopic beam paths.

It is evident, for a skilled person, that the deflection of the at least one pair of imaging beam paths by four deflecting elements, which is described in the first to third embodiments and corresponding Figures, is not a prerequisite for causing a location of the imaging of pupils in the vicinity of the mirror surface of the first deflecting element. Thus, a deflection by more or less than four deflecting elements is possible as an alternative, to reduce the length of the structure of the stereoscopic microscope. A side reversal and/or rotation of the imaging occurring due to the deflection by using more or less than four deflecting elements can be selectively corrected in a suitable manner in an optical way and/or digital way.

Figure 5:
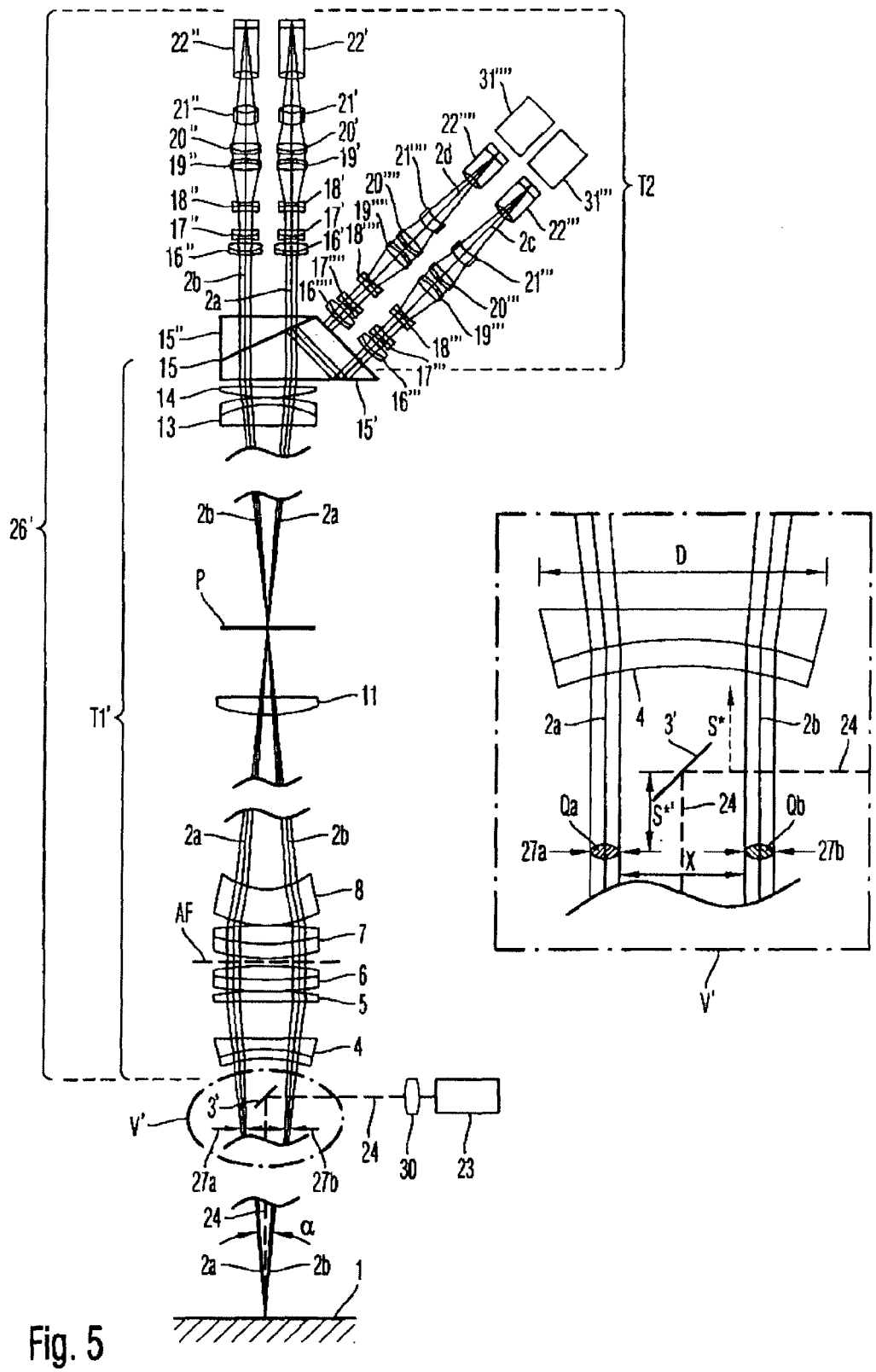

FIG. 5 schematically shows a beam path through an arrangement of selected elements of a stereoscopic microscope according to a first embodiment of the present invention, unfolded in one plane.

The fourth embodiment shown in FIG. 5 differs from the first to third embodiments shown in FIGS. 1 to 4 especially in that only one deflecting element with a mirror surface 3' is provided. Instead, for deflecting the imaging beam paths 2a, 2b, 2c and 2d this mirror surface 3' is adapted for deflecting the secondary beam path 24. Correspondingly the deflecting element is not part of the first optical subsystem T1', the optical elements of which commonly guide the imaging beam paths 2a, 2b, 2c and 2d.

According to this embodiment the imaging beam paths 2a, 2b, 2c and 2d guided in the first optical subsystem T1' are not folded, but extend straight. This absence of a folding of the imaging beam paths 2a, 2b, 2c and 2d results in a significantly longer structure of the stereoscopic microscope. For this reason the regions of the imaging beam paths 2a, 2b, 2c and 2d that are free of optical elements are not completely illustrated in FIG. 5.

To reducing the length of the structure of the stereoscopic microscope it is even possible in this embodiment, as an alternative, to deflect the imaging beam paths in the first optical subsystem by one or more deflecting elements. In this respect, even a fourfold reflection of the imaging beam paths (as in the preceding embodiments) is possible, as an example. However, it is emphasized that the present invention is not restricted to such a fourfold deflection. In contrast, the imaging beam paths could not be deflected at all, or be deflected more often or less often than four times by a corresponding number of deflecting elements.

With the exception of the missing deflecting elements for folding the imaging beam paths 2a, 2b, 2c and 2d, the optical elements of the imaging system of the stereoscopic microscope according to the fourth embodiment correspond to the optical elements of the first embodiment. Thus, a detailed description of these optical elements is omitted. In FIG. 5 the reference sign AF additionally denotes an afocal interface in between lenses 6 and 7.

As shown in the enlarged section V' of FIG. 5 according to the fourth embodiment, the lenses 4, 5, 6, 7, 8, 11, 13 and 14 of the first subsystem T1' are configured such that the pupil planes 27a and 27b of the imaging beam paths 2a, 2b, 2c and 2d are located in the vicinity of the mirror surface 3' of the deflecting element. In this respect, beam bundles of the imaging beam paths 2a, 2b, 2c and 2d respectively define cross-sectional areas Qa, Qb in the pupil planes 27a, 27b, which are separated by a distance X from one another. The mirror surface 3' of the deflecting element is located in a region in between the beam cross-sectional areas Qa, Qb. Further, a projection of the mirror surface 3' along the imaging beam paths 2a, 2b, 2c and 2d has a diameter that amounts to ⅔ of the distance X and thus is smaller than the distance X. Consequently, the beam cross-sectional areas Qa, Qb are free of the mirror surface 3'. It is evident that it is alternatively sufficient to build the diameter of the projection of the mirror surface 3' equal to the distance X of the beam cross-sectional areas Qa, QB.

The smaller diameter of the mirror surface 3' in comparison to the first to third embodiment results in that pupil planes 27a, 27b of the imaging beam paths 2a, 2b, 2c and 2d do not meet the first mirror surface 3' in the embodiment shown in FIG. 5, but are separated from the mirror surface 3' in a direction of the object plane 1 by a distance S*'.

As the mirror surface 3' is not covered by the beam cross-sectional areas Qa and Qb in the first embodiment, the distance S*' and S*, respectively, is measured along the optical axis perpendicular to the optical axis of the secondary beam path 24. The measurement of the distances of the pupil planes from the mirror surface 3' of the deflecting element that is relative to the optical axis of the secondary beam path 24 even provides a sufficient accuracy for determining distances S' and S, respectively, in the first, second and third embodiments described above, which also have a secondary beam path 24.

This distance S*, S*', can also occur in the direction of the object plane 1 (this distance is denoted as S*' in FIG. 5) as well as in the direction towards the first optical subsystem T1' (this distance is denoted as S* in dotted line in FIG. 5). In FIG. 5, the distance S*' amounts to about one quarter of the diameter of lens 4. In general, the distance S*, S*' can be smaller than 1.5 times, and especially smaller than 1.0 times, and further especially smaller than 0.5 times the diameter D of a lens that is located closest to the mirror surface 3' along the imaging beam paths 2a, 2b, 2c and 2d (in this case lens 4) of the lenses of the first optical subsystem T1'.

In the embodiment shown in FIG. 5, a free positioning of an observer with respect to the stereoscopic microscope is also possible by pairwise rotation of optical elements 16' to 22', 16" to 22" respectively 16'" to 31'" and 16"" to 31"".

Although use of a deflecting element having a conventional mirror surface 3' has been described above, the deflecting element alternatively may even be considered as a dichroitic element. This means that the deflecting element only reflects beams of a certain range of wavelengths guided in the secondary beam paths and is transparent for beams of another range of wavelengths guided in the imaging beam paths. Consequently, the deflecting element may be formed so large that it is traversed even by the imaging beam path, however does not deflect the imaging beam path. This facilitates arrangement of the deflecting elements, as a holder (not shown) for the deflecting element can be arranged outside the imaging beam paths.

A fifth embodiment of the present invention is described by reference to FIGS. 6A to 6D.

The fifth embodiment is based on the first embodiment described above. Reference is made to the description of the first embodiment. In the following, only differences between the fifth embodiment and the first embodiment are described.

Figure 6A:
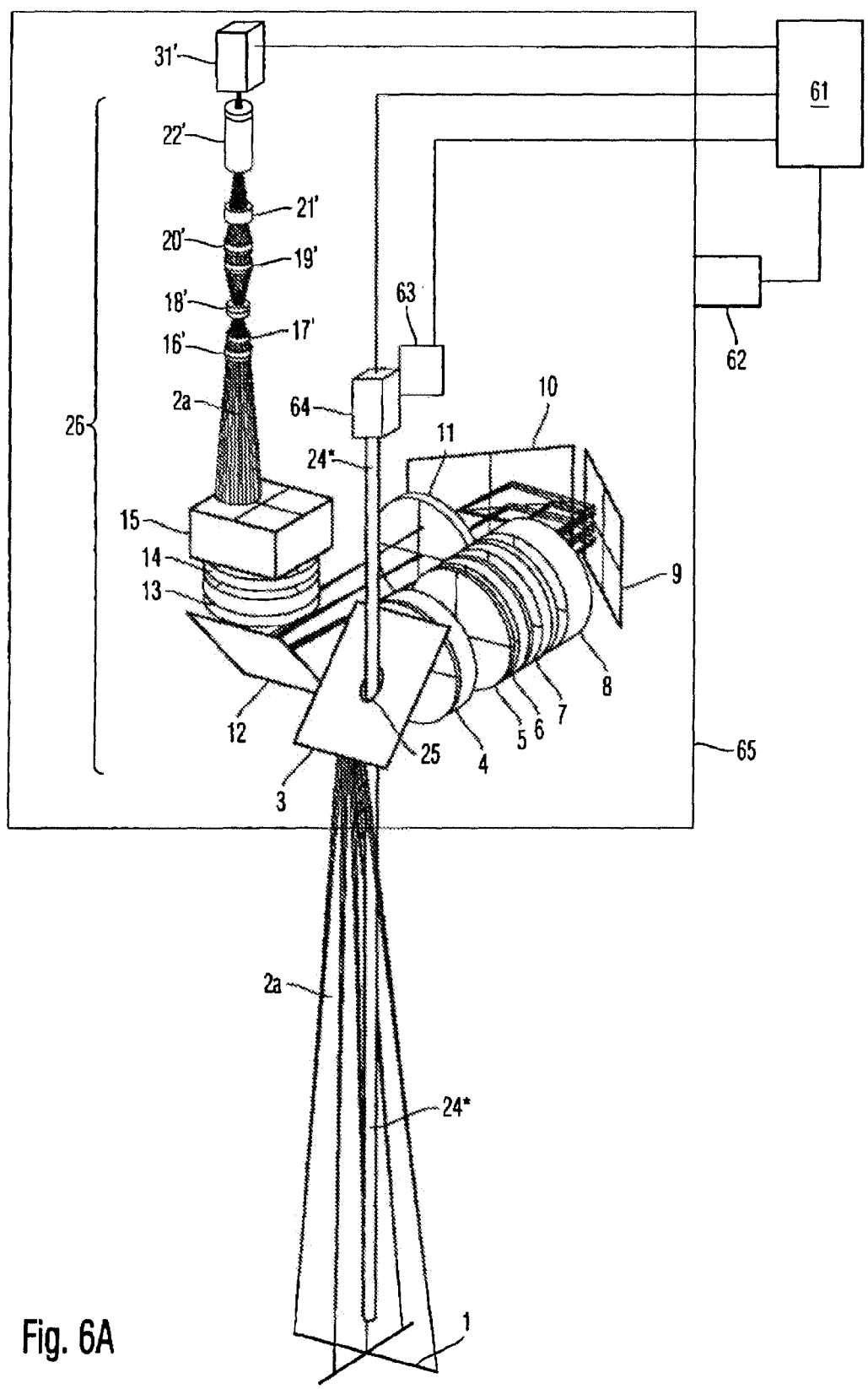

The fifth embodiment that is shown in perspective view in FIG. 6A differs from the first embodiment especially in that the secondary beam path 24 is guided in a pipe 24* of an endoscope. Consequently, in this embodiment, the pipe 24* of the endoscope traverses the first optical mirror surface 3 of the first optical deflecting element in an area in between the beam cross-sectional areas 28a, 28b, 28c and 28d of the imaging beam paths 2a, 2b, 2c, and 2d. In the shown embodiment, an endoscope optics is contained in the pipe 24*, which provides guidance for both an illumination beam path and an observation beam path. Alternatively, the illumination may even be provided in an additional secondary beam path (not specially shown) that is provided in addition to pipe 24* and that is guided in an area in between the beam cross-sectional areas 28a, 28b, 28c and 28d of the imaging beam paths 2a, 2b, 2c and 2d.

Evidently, the present invention is not restricted to an endoscope. For example, the pipe 24* may be used for guidance of a manipulator, a treatment beam path or an observation beam path. It is evident that in each of the above embodiments the secondary beam path 24 may be guided in such a pipe.

Furthermore, the fifth embodiment shown in FIG. 6A differs from the above embodiments in that the imaging system 26 of the stereoscopic microscope is contained in a casing 65. The casing is held by a mounting having a motorized drive, which mounting allows a free arrangement and orientation of the imaging system 26 of the stereoscopic microscope in space. To achieve this the special robotic mounting is mounted to a ceiling or the floor of a room, for example. In the present embodiment, the mounting 62 has several drives that are not explicitly shown, which may be controlled by a controller 61. Alternatively, the mounting may even be operated completely manually. It is evident that such a mount can be used for the imaging system of a microscope of each of the described embodiments, and is only facultative.

The embodiment shown in FIG. 6A additionally has a second mounting 63 for the pipe 24* of the endoscope. Even the second mounting 63 has motors that may be controlled by the controller 61. Consequently, the second mounting 63 allows a displacement of the pipe 24* of the endoscope relative to the imaging system 26 of the stereoscopic microscope. This orientation can be performed translationally or rotationally, for example. In the described embodiment, the second mounting 63 is configured such that the pipe 24* of the endoscope is guided essentially along the optical axis of the imaging system 26. Consequently, introduction and removal of the pipe 24*, and thus the whole endoscope, is possible. Further, in the shown embodiment the second mount is mechanically coupled with the casing 65 of the stereoscopic microscope and thus even with the first mounting 62. Alternatively, the second special robotic mounting 63 may even be mounted directly to the ceiling or the floor of a room, and thus be independent from the first mounting 62. It is obvious that the second mounting is only facultative and may be used in combination with the pipe in each of the embodiments described above. The first mount and the second mount, respectively, provide all the necessary axes for an arbitrary orientation/arrangement of both systems in space.

Furthermore, the imaging beam paths 2a to 2d of the fifth embodiment shown in FIG. 6A each comprise camera adaptors 31' to 13"" for cameras (not shown) that are connected to the controller 61. The camera 64 of the endoscope is also connected to the controller. In this embodiment, the controller is configured for outputting images taken by the cameras via a display such as a monitor or a headset (head mounted display) or a boom system, for example. In this respect, depending on choice, output of the images may either be performed simultaneously or alternatively, or either monoscopic or stereoscopic. The cameras and the controller are only facultative. Instead of the cameras, oculars may be provided, for example.

In the present embodiment, the image of the imaging system 26 that is generated by the cameras is used by the controller 61 to control introduction and removal of the pipe 24* of the endoscope. The controller may even be configured to automatically perform introduction and removal of the pipe 24* by using the images, and thus to correspondingly control the first and/or second mount 62, 63.

Although only one imaging beam path 2a of the second subsystem T2 is shown in FIG. 6A to provide a better overview, the stereoscopic microscope according to the fifth embodiment may comprise plural pairs of imaging beam paths, or only one imaging beam path. In the case that the stereoscopic microscope has only one, or only one pair, of imaging beam paths 2a, 2b, the beam splitter arrangement 15 can be omitted. Furthermore, by the provision of an aperture in the vicinity of the mirror surface, a combination with the third embodiment is possible.

Figure 6B:
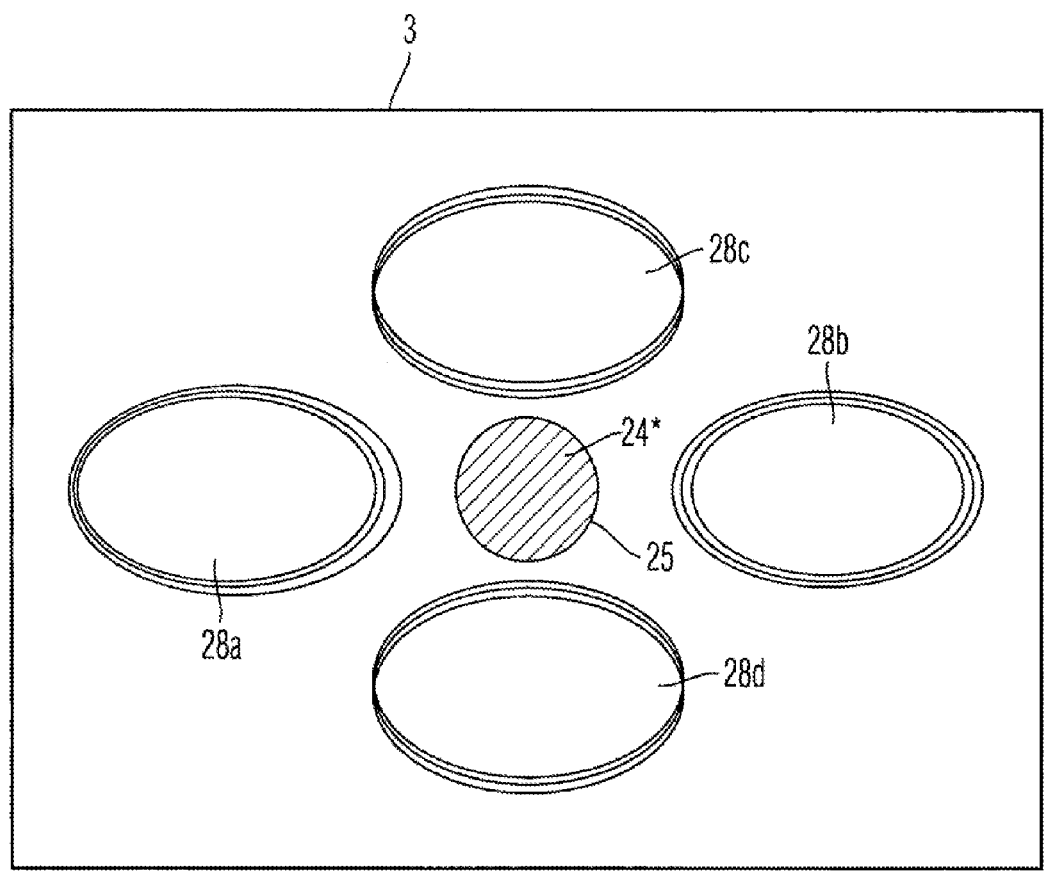

FIG. 6B schematically shows a top view on the first optical mirror surface 3 of the first optical deflecting element of a stereoscopic microscope according to the fifth embodiment. As shown, the central guidance of the pipe 24* of the endoscope allows a free location of the pairs of imaging beam paths encircling the pipe 24*. Consequently, by rotation of the imaging beam paths about the pipe 24*, a free positioning of a user with respect to the stereoscopic microscope is possible.

Figure 6C:
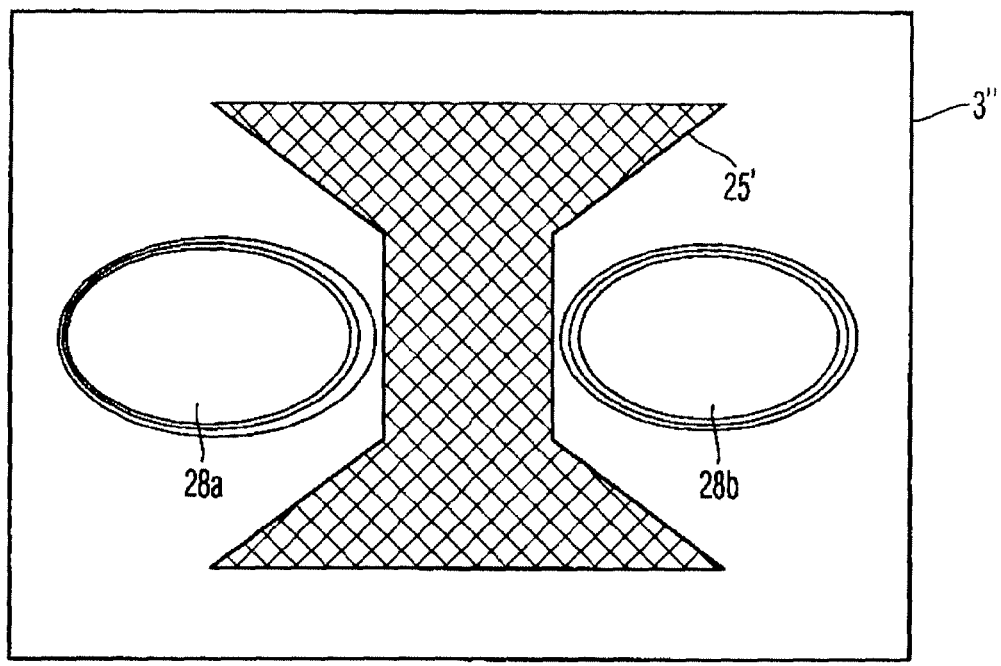

FIG. 6C schematically shows a top view on a first optical mirror surface 3" of the first deflecting element of a stereoscopic microscope according to a variation of the above fifth embodiment.

According to this variation of the fifth embodiment, the imaging system 26 of the stereoscopic microscope only provides one pair of imaging beam paths 2a, 2b. The beam splitter arrangement 15 has been omitted. Furthermore, a free positioning of an observer is prevented in this embodiment.

Consequently, it is possible to provide a significantly increased cut 25' (cross-hatched) for the arrangement of one or multiple pipes or multiple surgical instruments and/or one or multiple secondary beam paths in the first mirror surface 3.

Figure 6D:
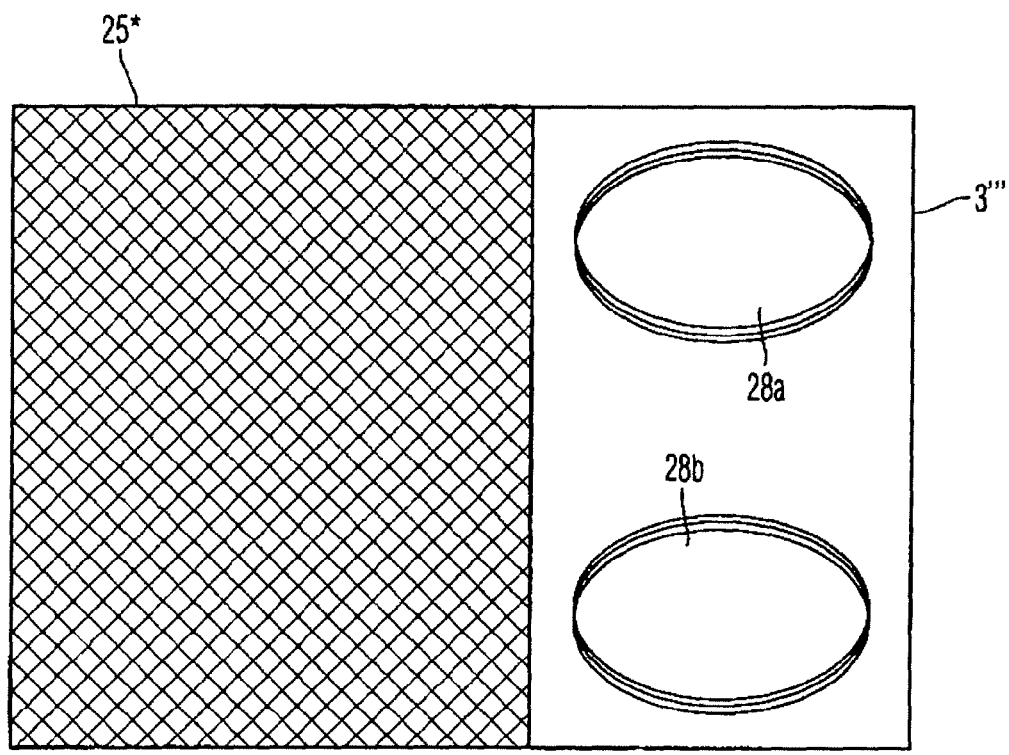

FIG. 6D schematically shows a top view of the first optical mirror surface 3''' of a first deflecting element according to a further variation of the fifth embodiment of the present invention.

According to this further variation, the imaging system 26 of the stereoscopic microscope only provides one pair of imaging beam paths 2a, 2b and prevents a free positioning of an user. Furthermore, the at least one pipe 24* and/or the at least one secondary beam path 24 traverses the first optical mirror surface 3''' of the first optical deflecting element not in a region in between the beam cross-sectional areas 28a, 28b, 28c, 28d, of the imaging beam paths 2a, 2b, 2c, 2d but is located in an area 25* (cross-hatched) neighboring the first optical mirror surface 3'''. This has the advantage that a vignetting of the beam path of the imaging system 26 of the stereoscopic microscope is reduced in comparison to FIGS. 6B and 6C. Furthermore, arrangement of the at least one pipe 24* and/or at least one secondary beam path 24 is especially flexible. This is due to the fact that at least one pipe 24* and/or the at least one secondary beam path 24 has an increased angle with respect to the imaging beam paths 2a and 2b.

A sixth embodiment of the present invention will be described in the following by reference to FIG. 7.

The sixth embodiment is based on the third embodiment described above, which is referenced to in its entirety. In the following, only differences of the sixth embodiment from the third embodiment are described.

Figure 7:
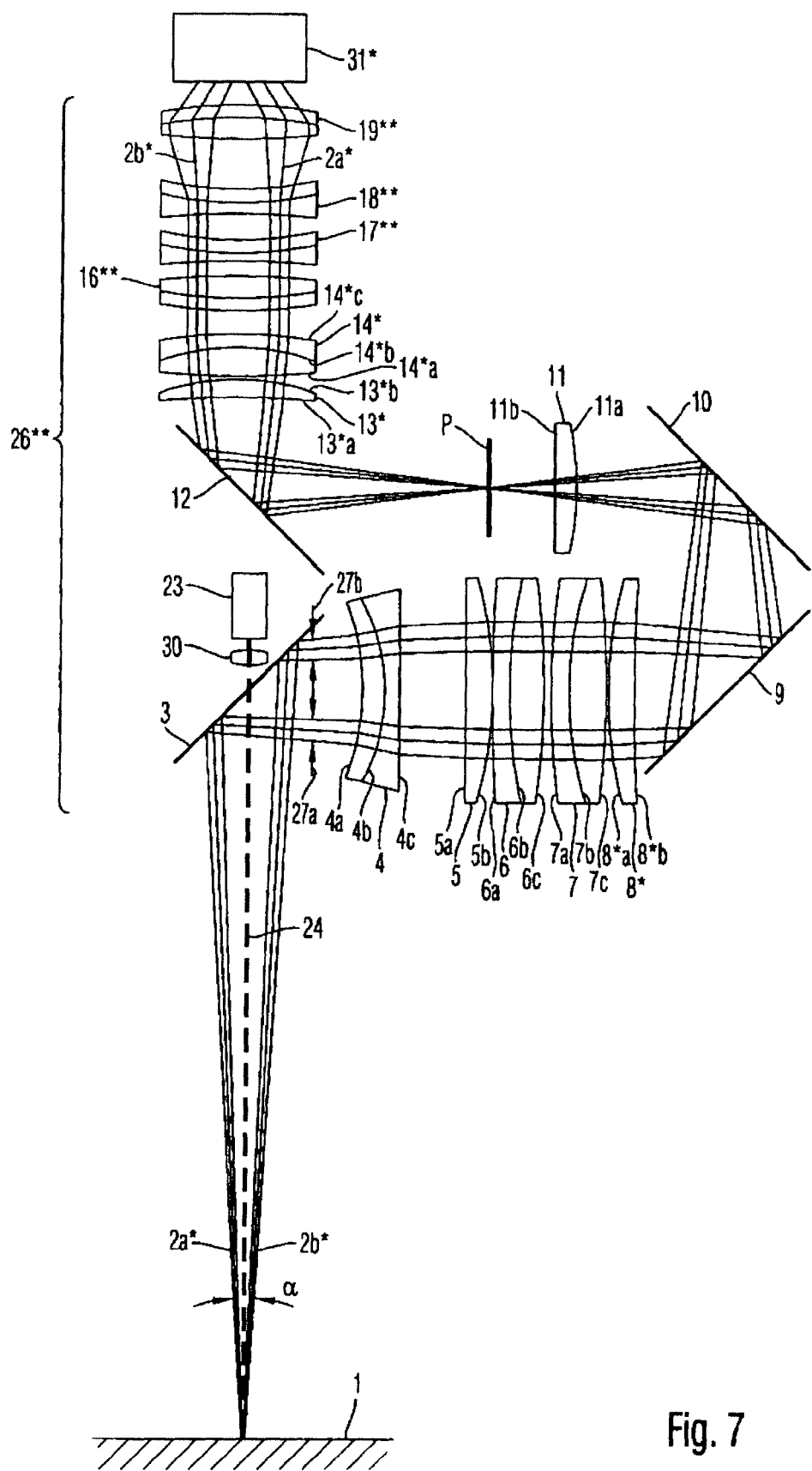
Figure 8A:
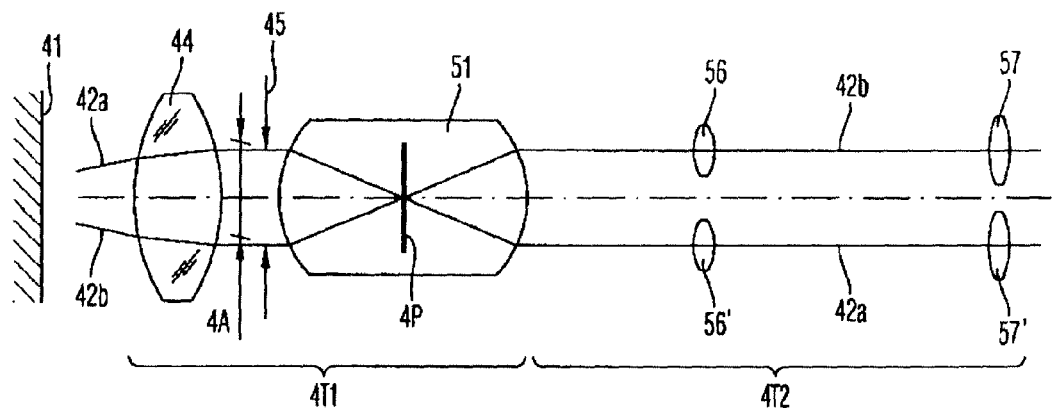
Figure 8B:
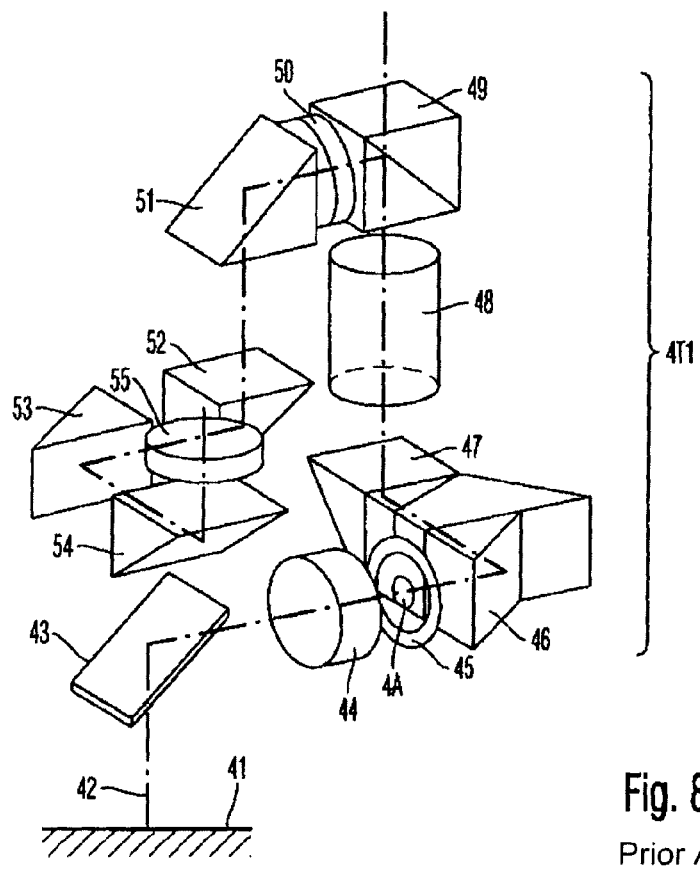

The sixth embodiment shown in FIG. 7 differs from the third embodiment especially in that no switchable aperture is provided. Consequently, no different imaging beam paths are defined in the incident beams, so that a monoscopic microscope is formed.

In the sixth embodiment, the first optical mirror surface 3 also has a cut, through which a secondary beam path 24 is guided. Alternatively, more than one secondary beam path or alternatively or additionally one or multiple pipes may be guided through the cut. As imaging of a pupil of the imaging system is performed in the vicinity of the mirror surface 3, the provision of a cut and maybe a pipe in this region results in the fact that a shadowing caused by this arrangement is distributed over the whole image.

Although a digital camera 31* is used in FIG. 7 for generating an image, it is obviously, that as an alternative, even an ocular for direct observation by a user may be provided.

In the sixth embodiment a first and/or second mount may also be provided; it is also possible not to fold the beam path.

It is emphasized that the embodiments described above are only exemplary. Consequently, the described embodiments can be arbitrarily combined with one another, for example. Furthermore, variations of the above embodiments are possible.

In summary, the embodiments of the present invention provide a microscope or a stereoscopic microscope, which has an especially simple and compact structure and provides degrees of freedom for at least one observer with respect to their position relative to an observed object that can be placed in the object plane 1.

Furthermore, the proposed microscope or stereoscopic microscope, respectively, provides a secondary beam path 24, that pairwise includes an angle of smaller than 5° and especially smaller than 3° and further especially substantially equal to 0° with imaging beam paths 2a and 2b respectively 2c and 2d of the stereoscopic microscope. At the same time, a deterioration of imaging beams guided in the imaging beam paths 2a, 2b by secondary beams guided in the secondary beam path 24 is avoided with high efficiency, as the imaging beams and the secondary beams do not overlap in optical element.

Such a microscope or stereoscopic microscope, respectively, is especially well suited for use as a surgical microscope.

What is claimed is:

1. A microscope imaging an object that can be placed in an object plane of the microscope, wherein the microscope provides at least one imaging beam path and comprises:
   at least one deflecting element with a mirror surface; and
   an imaging system with several optical elements;
   wherein the several optical elements comprise a plurality of lenses and wherein the several optical elements are configured such that a plane defined by a pupil of the at least one imaging beam path is located neighboring the mirror surface and intersects the mirror surface of the at least one deflecting element or is located with a distance from the mirror surface, wherein the distance is smaller than 1.5 times a diameter of a lens located closest to the mirror surface along the at least one imaging beam path of the plurality of lenses, wherein the pupil plane is the curved or flat plane in which central or main beams of beam bundles guided in the at least one imaging beam path intersect one another, wherein the central or main beams are emitted from different object points in the object plane.

2. The microscope of claim 1 wherein the distance is smaller than 1.0 times the diameter.

3. The microscope of claim 2 wherein the distance is smaller than 0.5 times the diameter.

4. The microscope of claim 1 wherein the at least one imaging beam path in between the mirror surface of the deflecting element and the object plane of the microscope is free from optically effective elements.

5. The microscope of claim 1 wherein the several optical elements of the imaging system further comprise the at least one deflecting element, and wherein the mirror surface of the at least one deflecting element is configured for deflecting the at least one imaging beam path.

6. The microscope of claim 5 wherein the microscope provides at least one secondary beam path located neighboring the mirror surface of the at least one deflecting element or traversing the same in an area outside of a maximal beam cross-sectional area of the at least one imaging beam path.

7. The microscope of claim 6 further comprising an observation system with imaging optics, which provides the at least one secondary beam path.

8. The microscope of claim 6 further comprising at least one of an illumination system with a beam source and an illumination optics for illuminating the object plane, an infrared observation system with an infrared imaging optics, or a laser with a beam guidance system, one of which provides the at least one secondary beam path.

9. The microscope of claim 8 further comprising a mounting with at least three degrees of freedom for at least one of the beam source and the illumination optics, the infrared observation system with the infrared imaging optics, or the laser with the beam guidance.

10. The microscope of claim 9 wherein the mounting is robotic.

11. The microscope of claim 5 wherein the microscope comprises at least one pipe which is located neighboring the mirror surface of the at least one deflecting element or which traverses the same in an area outside of a maximal cross-sectional area of the at least one imaging beam path.

12. The microscope of claim 11 wherein a secondary beam path is guided in the pipe.

13. The microscope of claim 1 wherein the microscope further provides at least one secondary beam path, and wherein the mirror surface of the at least one deflecting element is configured for deflecting the at least one secondary beam path.

14. The microscope of claim 13 wherein a beam bundle of the at least one imaging beam path defines a cross-sectional area in the plane defined by the pupil, and
   wherein the mirror surface of the at least one deflecting element is located neighboring this beam cross-sectional area of the at least one imaging beam path, wherein the beam cross-sectional area is free from the mirror surface of the at least one deflecting element.

15. The microscope of claim 13 further comprising at least one of an illumination system with a beam source and an illumination optics for illuminating the object plane, an infrared observation system with infrared imaging optics, or a laser with a beam guidance system, one of which provides the at least one secondary beam path.

16. The microscope of claim 15 further comprising a mounting with at least three degrees of freedom for at least one of the beam source and illumination optics, the infrared observation system with the infrared imaging optics, or the laser with the beam guidance.

17. The microscope of claim 16 wherein the mounting in robotic.

18. The microscope of claim 13 further comprising an observation system with imaging optics providing the at least one secondary beam path.

19. The microscope of claim 1 wherein the plurality of lenses is located along one common optical axis, and wherein two lenses are displaceable relative to one another along the optical axis.

* * * * *